US008054058B2

(12) United States Patent
Liu et al.

(10) Patent No.: US 8,054,058 B2
(45) Date of Patent: Nov. 8, 2011

(54) DC-DC CONVERTER WITH IMPROVED DYNAMIC RESPONSE

(75) Inventors: Yan-Fei Liu, Kingston (CA); Eric Meyer, Kingston (CA)

(73) Assignee: Queen's Univeristy at Kingston, Kingston, ON (CA)

( * ) Notice: Subject to any disclaimer, the term of this patent is extended or adjusted under 35 U.S.C. 154(b) by 420 days.

(21) Appl. No.: 12/081,578

(22) Filed: Apr. 17, 2008

(65) Prior Publication Data

US 2008/0258701 A1 Oct. 23, 2008

Related U.S. Application Data

(60) Provisional application No. 60/907,794, filed on Apr. 17, 2007.

(51) Int. Cl.
G05F 1/565 (2006.01)
G05G 1/595 (2006.01)

(52) U.S. Cl. .................................. 323/284; 323/285

(58) Field of Classification Search .................. 323/266, 323/271, 282, 284, 285
See application file for complete search history.

(56) References Cited

U.S. PATENT DOCUMENTS

| | | | |
|---|---|---|---|
| 5,422,562 A | 6/1995 | Mammano et al. | |
| 5,838,145 A * | 11/1998 | Poon et al. | 323/266 |
| 5,963,439 A | 10/1999 | Wuidart et al. | |
| 6,229,292 B1 * | 5/2001 | Redl et al. | 323/285 |
| 6,271,651 B1 | 8/2001 | Stratakos et al. | |
| 6,504,351 B2 * | 1/2003 | Eagar et al. | 323/282 |
| 6,753,723 B2 | 6/2004 | Zhang | |
| 6,831,448 B2 | 12/2004 | Ishii et al. | |
| 7,002,817 B2 | 2/2006 | Lipcsei | |
| 7,521,907 B2 * | 4/2009 | Cervera et al. | 323/268 |
| 2005/0068794 A1 * | 3/2005 | Weng et al. | 363/50 |
| 2005/0270813 A1 * | 12/2005 | Zhang et al. | 363/89 |
| 2008/0252280 A1 * | 10/2008 | Prodic et al. | 323/283 |

OTHER PUBLICATIONS

Abdel-Rahman, Osama, et al., "Transient response improvement in DC-DC converters using output capacitor current for faster transient detection", PESC 157-160 (2007).

(Continued)

Primary Examiner — Adolf Berhane
Assistant Examiner — Fred E Finch, III
(74) Attorney, Agent, or Firm — Stephen J. Scribner; Carol Miernicki Steeg

(57) ABSTRACT

The invention relates to a control method and a controller for a DC-DC converter, such as a synchronous Buck converter, which exploits the principle of capacitor charge balance to allow the converter to recover from a positive and/or negative load current step in the shortest achievable time, with the lowest possible voltage undershoot/overshoot. The control method may be implemented by either an analog or a digital circuit. The controller may be integrated with existing controller schemes (such as voltage-mode controllers) to provide superior dynamic performance during large-signal transient conditions while providing stable operation during steady state conditions. The invention also relates to a method and a modification of a DC-DC converter topology that comprises connecting a controlled current source between an input terminal and an output terminal of the DC-DC converter; detecting a load current step to a new load current; modifying a duty cycle of the DC-DC converter; and modifying current through a parallel output capacitor of the DC-DC converter by controlling current of the current source. The methods and circuits provided herein are applicable to Buck converters and Buck-derived converters such as forward, push-pull, half-bridge, and full-bridge converters.

13 Claims, 45 Drawing Sheets

OTHER PUBLICATIONS

Barrado, Andres, et al., "The fast response double buck DC-DC converter (FRDB): Operation . . . influence", IEEE Transactions on Power Electronics, 20(6): 1261-1270 (Nov. 2005).

Leung, Kelvin K.S., et al., "A comparative study of the boundary control of buck converters . . . conduction mode", PESC 2133-2139 (2005).

Leung, Kelvin K.S., et al., "Derivation of a second-order switching surface in the boundary control of buck converters", IEEE Power Electronics Letters 2: 63-67 (2004).

Sota, A., et al., "Analysis of the buck converter for scaling the supply voltage of digital circuits", APECE, 18th Annual IEEE, vol. 2: 711-717 (2003).

* cited by examiner

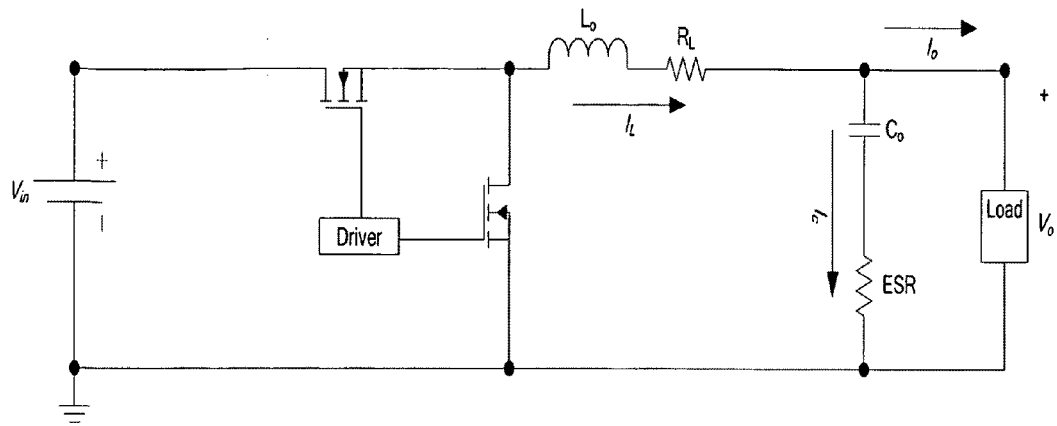
Figure 1    (Prior Art)
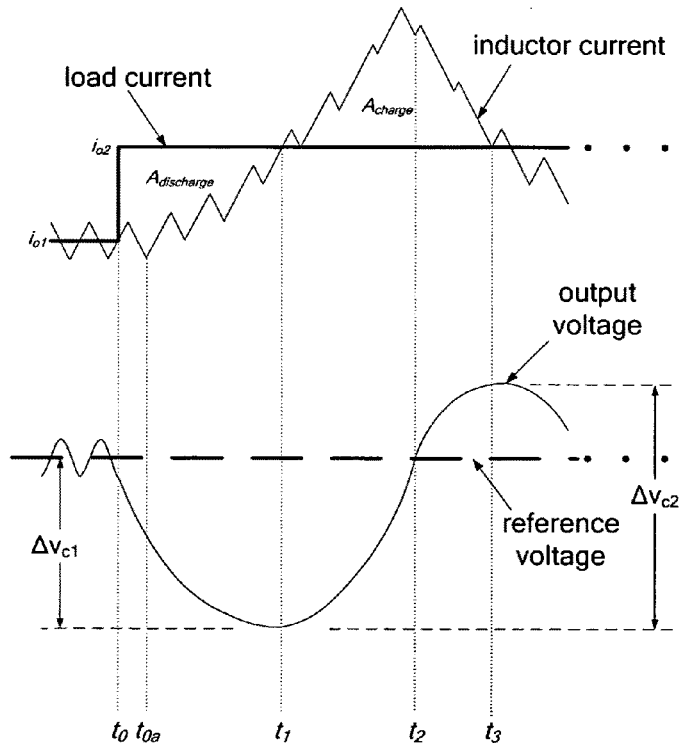
Figure 2    (Prior art)

DC-DC CONVERTER WITH IMPROVED DYNAMIC RESPONSE

RELATED APPLICATIONS

This application claims the benefit of the filing date of U.S. Provisional Patent Application No. 60/907,794, filed on Apr. 17, 2007, the contents of which are incorporated herein by reference in their entirety.

FIELD OF THE INVENTION

This invention relates to methods and circuits for improving the dynamic response of a DC-DC converter to a load current step. The methods and circuits relate to controllers for DC-DC converters and to DC-DC converter topology.

BACKGROUND OF THE INVENTION

As voltage regulation criteria for digital circuits such as CPUs become more stringent, the demand for high dynamic performance power converters increases. Among the many characteristics of dynamic performance, output voltage overshoot/undershoot and recovery time are often considered the most important. In general, the output voltage deviates under load current change, or input voltage change. To improve the dynamic response of a DC-DC converter, the switching frequency and/or output filter can be altered.

For example, increasing the switching frequency may improve the dynamic response of a converter having a small output capacitance. However, increasing the switching frequency complicates the design of the converter, and as the switching frequency increases, the efficiency of the converter decreases eventually to an unacceptable level.

Increasing the output capacitance of a converter can help to maintain the output voltage during a sudden load current change. However, this strategy requires a very large output capacitor (e.g., 5,000 to 10,000 µF), which is bulky and expensive, and consequently is not practical. Alternatively, reducing the output inductance of a DC-DC converter can improve its dynamic response. However, such a reduction results in an increase in output voltage ripple. The increased voltage ripple will in turn reduce the room for the output voltage drop during dynamic response. In addition, a larger ripple current through the filter inductor will result in a larger RMS current through the power switches of the converter, which will reduce the overall efficiency of the converter under steady state operation.

It is evident that such options for improving the dynamic response of a DC-DC converter do not provide a viable solution.

Various control methods have been proposed for improving the dynamic response of a power converter. Use of current mode control may provide a faster dynamic response than conventional voltage mode control in situations where only a small change in load current occurs. On the other hand, voltage mode control has superior dynamic response when a large transient occurs. More importantly, use of current mode control in high current applications may be impractical because of the limitations on accurate and efficient current sensing at high current.

For example, energy balancing techniques [1]-[2] and second-order switching surfaces [3] were proposed to minimize the settling time and the voltage overshoot/undershoot due to a load transient. Other schemes include a switch for shorting the output inductor of a Buck converter was disclosed in U.S. Pat. No. 6,271,651, issued Aug. 7, 2001 to Stratakos et al. This method provides a relatively simple way to increase the output current during a step increase in load current. A method of improving transient response of a Buck converter, but only during a negative load current step, was proposed in U.S. Pat. No. 6,753,723, issued Jun. 22, 2004 to Zhang. U.S. Pat. No. 7,002,817, issued Feb. 21, 2006 to Lipcsei, disclosed a further method based on comparing the output voltage of the converter with a reference voltage. Others have proposed digital control for power converters (e.g., U.S. Pat. No. 7,019,505, issued Mar. 28, 2006, and U.S. Pat. No. 7,038,438, issued May 2, 2006, both to Dwarakanath et al.).

None of the schemes mentioned above is capable of providing the transient response required for high performance power converters. In particular, none of these schemes properly address the voltage overshoot caused by a step-down load current transient, which may be more than five times as large as the corresponding voltage undershoot caused by a positive current step of equal magnitude. To address the large overshoots typical of voltage regulator module (VRM) applications, auxiliary circuits have been proposed for the Buck converter.

For example, in [4]-[5], a transformer was connected across the impedance of the output trace of a Buck converter to inject/absorb excess load current to improve the dynamic performance. In [6], an auxiliary switch was used to bypass the output inductor of a Buck converter to provide a very low inductance path to the output. The switch remains full-on for the duration that the output voltage deviation exceeds a predetermined threshold. An auxiliary switch in series with a small inductor was used in [7] to recover excess current to the input during step-down load transients. The circuit also provided a low-impedance auxiliary path for step-up load transients. The auxiliary circuit was controlled using a differentiator in an attempt to instantaneously track the capacitor current. In [8], the output of an isolated DC-DC converter was connected through an auxiliary circuit (similar to [7]) to a voltage rail (fed by the rectified voltage of the secondary winding) to inject/absorb excess current. The auxiliary circuit was controlled linearly based on the magnitude of the output voltage. An auxiliary circuit (similar to [7]) was connected to the output of a Buck converter in [9]. The switch is turned full-on for the duration that the output voltage deviation exceeds a predetermined threshold.

While such topology modifications may improve the dynamic response of a DC-DC converter during a load transient, they suffer from at least one of the following: complicated transformer design due to high-frequency operation; auxiliary switch control susceptible to noise caused by auxiliary switching; unpredictable auxiliary switching frequencies; no direct current-mode control of the auxiliary circuit resulting in unpredictable and potentially damaging currents; and high auxiliary peak current to average current ratio resulting in necessity of relatively large auxiliary switches for desired dynamic performance.

SUMMARY OF THE INVENTION

One aspect of the invention relates to a control method and a controller for a DC-DC converter, such as a synchronous Buck converter, which exploits the principle of capacitor charge balance to allow the converter to recover in the shortest achievable time, with the lowest possible voltage undershoot/overshoot. The control method may be implemented by either an analog or a digital circuit. The analog version of the control method is relatively inexpensive to implement as only simple components (e.g., amplifiers, comparators, etc.) are used. The control method may be integrated with existing controller schemes (such as voltage-mode controllers) to provide superior dynamic performance during large-signal transient conditions while providing stable operation during steady state conditions.

The methods and circuits provided herein are applicable to Buck converters and Buck-derived converters such as forward, push-pull, half-bridge, and full-bridge converters.

According to a first aspect of the invention there is provided a method for minimizing the output voltage deviation of a DC-DC converter in response to a load current step; comprising: (A) (i) detecting a positive load current step to a new load current, the positive load current step removing at least a portion of the stored charge from a parallel output capacitor of the DC-DC converter; (ii) increasing a duty cycle of the DC-DC converter to increase current through a series output inductor, such current being greater than the new load current; and (iii) decreasing the duty cycle of the DC-DC converter to simultaneously cause (a) the inductor current to decrease to be equal the new load current and (b) the at least a portion of the stored charge removed from the parallel output capacitor during the positive load current step to be replaced; and/or (B) (i) detecting a negative load current step to a new load current, the negative load current step adding charge to the stored charge of a parallel output capacitor of the DC-DC converter; (ii) decreasing a duty cycle of the DC-DC converter to decrease current through a series output inductor, such current being less than the new load current; and (iii) increasing the duty cycle of the DC-DC converter to simultaneously cause (a) the inductor current to increase to be equal the new load current and (b) the charge added to the parallel output capacitor during the negative load current step to be removed.

The method may comprise increasing the duty cycle of the DC-DC converter to a maximum value. The method may comprise decreasing the duty cycle of the DC-DC converter to a minimum value.

In one embodiment, detecting the positive load current step and/or the negative load current step may comprise sensing the output capacitor current. The output capacitor current may be sensed using a trans-impedance amplifier. The method may comprise estimating the output capacitor current by determining the output capacitor current slope using a set of capacitor current estimations.

The first aspect of the invention also relates to a controller for minimizing the output voltage deviation of a DC-DC converter in response to a load current step; comprising: (A) a detector for detecting a positive load current step to a new load current, the positive load current step removing at least a portion of the stored charge from a parallel output capacitor of the DC-DC converter; means for increasing a duty cycle of the DC-DC converter to increase current through a series output inductor, such current being greater than the new load current; and means for decreasing the duty cycle of the DC-DC converter to simultaneously cause (a) the inductor current to decrease to be equal the new load current and (b) at least a portion of the stored charge removed from the parallel output capacitor during the positive load current step to be replaced; and/or (B) a detector for detecting a negative load current step to a new load current, the negative load current step adding charge to the stored charge of a parallel output capacitor of the DC-DC converter; means for decreasing a duty cycle of the DC-DC converter to decrease current through a series output inductor, such current being less than the new load current; and means for increasing the duty cycle of the DC-DC converter to simultaneously cause (a) the inductor current to increase to be equal the new load current and (b) the charge added to the parallel output capacitor during the negative load current step to be removed.

The means for increasing the duty cycle of the DC-DC converter may increase the duty cycle to a maximum value, and/or the means for decreasing the duty cycle may decrease the duty cycle to a minimum value. The means for increasing the duty cycle and/or the means for decreasing the duty cycle may comprise a double integrator. The means for detecting may comprise a trans-impedance amplifier that senses the output capacitor current or a means for estimating the output capacitor current by determining the output capacitor current slope using a set of capacitor current estimations.

A second aspect of the invention relates to a method for minimizing the output voltage deviation of a DC-DC converter in response to a load current step; comprising: connecting a current source in parallel with a parallel output capacitor of the DC-DC converter; detecting a load current step to a new load current; modifying a duty cycle of the DC-DC converter; and modifying current through the parallel output capacitor, wherein output current of the DC-DC converter reaches the new load current with minimal deviation of the output voltage.

In one embodiment the method may comprise: connecting a controlled current source between an input terminal of the DC-DC converter and an output terminal of the DC-DC converter; detecting a load current step to a new load current; modifying a duty cycle of the DC-DC converter; and modifying current through a parallel output capacitor of the DC-DC converter by controlling current of the current source; wherein output current of the DC-DC converter reaches the new load current with minimal deviation of the output voltage.

In one embodiment, connecting a controlled current source may comprise connecting in series an inductor and a switch in parallel with the parallel output capacitor, and connecting a rectifier with its anode connected to a point between the inductor and the switch and its cathode connected to an input voltage of the DC-DC converter.

In another embodiment connecting a controlled current source may comprise connecting in series an inductor and a rectifier in parallel with the parallel output capacitor, the rectifier having its anode connected to circuit ground and its cathode connected to the inductor, and connecting a switch between (i) a point between the inductor and the rectifier and (ii) an input voltage of the DC-DC converter.

In another embodiment, connecting a controlled current source may comprise connecting in series an inductor and a first switch in parallel with the parallel output capacitor, and connecting a second switch between (i) a point between the inductor and the first switch and (ii) an input voltage of the DC-DC converter.

The method may comprise operating the controlled current source according to a function selected from current-mode hysteretic, peak current mode, average current mode, and constant duty cycle.

The method may comprise operating the controlled current source using a charge balance auxiliary branch controller, a simplified auxiliary branch controller, a variable current auxiliary branch controller, or a voltage detector auxiliary branch controller.

Detecting may further comprise (i) estimating the output capacitor current by determining the output capacitor current slope using a set of capacitor current estimations; (ii) sensing the output capacitor current using a trans-impedance amplifier; or (iii) sampling the output voltage at an auxiliary switching frequency.

According to the second aspect of the invention there is provided a DC-DC converter comprising: a current source connected in parallel with a parallel output capacitor of the DC-DC converter; and a controller that controls the current source by detecting a load current step to a new load current, modifying a duty cycle of the DC-DC converter; and modifying current through the parallel output capacitor; wherein output current of the DC-DC converter reaches the new load current with minimal deviation in output voltage.

In one embodiment the DC-DC converter may comprise: a controlled current source connected between an input terminal of the DC-DC converter and an output terminal of the DC-DC converter; and a controller that controls the current source by (a) detecting (i) a load current step to a new load current, or (ii) an output voltage change; (b) modifying a duty cycle of the DC-DC converter in response to the detected load current step or output voltage change; and (c) modifying current through a parallel output capacitor of the DC-DC converter by controlling current of the current source; wherein output current of the DC-DC converter reaches the new load current with minimal deviation in output voltage.

The controller may operate the current source according to a function selected from current-mode hysteretic, peak current mode, average current mode, and constant duty cycle.

The controller may comprise a charge balance auxiliary branch controller, a simplified auxiliary branch controller, a variable current auxiliary branch controller, or a voltage detector auxiliary branch controller.

A third aspect of the invention relates to a method for minimizing the output voltage deviation of a DC-DC converter in response to a load current step as described above with respect to the first aspect, further comprising: connecting a controlled current source between the input and the output of the DC-DC converter; and modifying current through a parallel output capacitor of the DC-DC converter by controlling current of the current source in response to the detected load current step; wherein output current of the DC-DC converter reaches the new load current with minimal deviation of the output voltage.

There is also provided a DC-DC converter in accordance with the third aspect of the invention.

According to further aspects of the invention, various combinations of the methods and circuits described herein may be employed to further improve the dynamic performance of a DC-DC converter in response to positive and/or negative load current steps.

BRIEF DESCRIPTION OF THE DRAWINGS

For a more complete understanding of the invention, and to show more clearly how it may be carried into effect, embodiments of the invention will be described, by way of example, with reference to the accompanying drawings, wherein:

FIG. 1 is a schematic diagram of a conventional synchronous Buck converter;

FIG. 2 shows the voltage-mode controlled response of the Buck converter of FIG. 1 to positive load current step;

FIG. 29, charge balance auxiliary control; FIG. 30, simplified control; FIG. 31, voltage level detector control. For each figure: top panel, output voltage; bottom panel, inductor current, load current, and auxiliary current;

DETAILED DESCRIPTION OF PREFERRED EMBODIMENTS

Figure 3A:
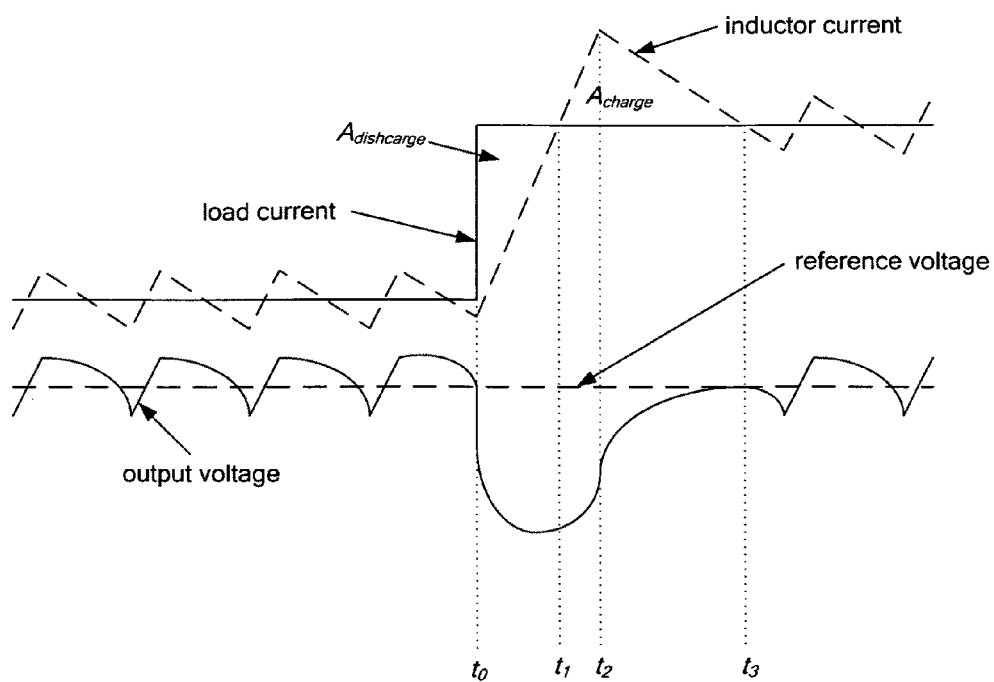
FIGS. 3(a) and (b) show key waveforms of an embodiment of the invention during a response to a positive load current step and a negative load current step, respectively.

According to a broad aspect of the invention there is provided a method for improving the dynamic response of a power converter, such as a synchronous Buck converter, and Buck-derived converters such as forward, push-pull, half-bridge, and full-bridge converters. One aspect of the invention relates to a controller for improving the transient performance of a power converter in response to a positive and/or negative load current step. The controller may be used with a conventional power converter without topology modification, thereby greatly reducing the size, component count, and cost for a high-performance converter.

Another aspect of the invention relates to a modification of a power converter, such as a synchronous Buck converter and Buck-derived converters such as forward, push-pull, half-bridge, and full-bridge converters, and an associated controller, for improving the transient performance of the converter in response to a negative load current step.

A further aspect of the invention relates to a power converter incorporating the controllers and methods described herein for improving the transient performance of the converter in response to both positive and negative load current steps.

I. Conventional Buck Converter Performance

Operation of a conventional synchronous Buck converter with control and synchronous MOSFETS Q1 and Q2, respectively (see FIG. 1) will first be reviewed, with reference to FIG. 2, which shows its typical response under a conventional control method to a positive load current step.

As shown in FIG. 2, at t0 the load current steps from a light load to a heavy load. However, the inductor current cannot change instantaneously to compensate for the load step, thus the output capacitor must supply the difference in current ($i_c = i_o - i_L$). This will cause the capacitor to begin to discharge, causing the output voltage to decrease.

At $t_{0a}$, the controller reacts to the voltage drop by increasing the duty cycle of the control MOSFET in order to drive the inductor current toward the new load current. As used herein, the term "new load current" is intended to mean the load current after a positive or a negative load current step. Depending on the characteristics of the controller, the duty cycle may or may not reach 100%. Since current is still being supplied from the output capacitor, the output voltage continues to drop.

At $t_1$, the inductor current reaches the new load current. The capacitor current is equal to zero and the total voltage drop (excluding equivalent series resistance (ESR) effects) is determined by equation (1).

$$\Delta v_{C1} = \frac{1}{C}\int_0^1 (i_c)dt = \frac{1}{C}\int_0^1 (i_{o2} - i_L)dt = \frac{1}{C}A_{discharge} \quad (1)$$

Since the output voltage is still less than the reference voltage, the controller will maintain a high duty cycle causing the inductor current to continue to rise. The excess inductor current begins to charge the capacitor, causing the output voltage to increase.

At $t_2$, the output voltage equals the reference voltage. However, the converter has not recovered since the inductor current is greater than the load current. The capacitor will continue to charge, causing the voltage to increase beyond the reference voltage. The controller compensates by decreasing the duty cycle, causing the inductor current to decrease toward the load current.

At $t_3$, the inductor current equals the load current. The voltage increase $\Delta v_{c2}$, caused by charging the capacitor, is expressed by equation (2).

$$\Delta v_{C2} = \frac{1}{C}\int_1^2 (i_c)dt = \frac{1}{C}\int_1^2 (i_L - i_{o2})dt = \frac{1}{C}A_{charge} \quad (2)$$

At $t_3$, $A_{charge}$ is greater than $A_{discharge}$, therefore the output voltage is greater than the reference voltage. The converter compensates for this overshoot by decreasing the duty cycle, causing the inductor current to, once again, fall below the load current value. This cyclical pattern will continue for many more switching cycles, causing the total recovery time to be excessive.

II. Dynamic Controller for Improving Response to a Load Current Step

The invention overcomes the above-mentioned drawbacks of DC-DC converter control by providing an analog or digital control method that exploits the principle of capacitor charge balance to allow the converter to recover from a positive and/or negative load current step in the shortest achievable time, with the lowest possible voltage undershoot/overshoot for a given DC-DC converter topology. Optionally, a novel or modified DC-DC converter topology may be used with the control method to enhance transient performance.

One embodiment relates to an analog controller for a DC-DC converter, such as a synchronous Buck converter, which exploits the principle of capacitor charge balance. The controller is relatively inexpensive to implement as only simple components (e.g., amplifiers, comparators, etc.) are used. The controller may be integrated with existing controller schemes (such as voltage-mode controllers) to provide superior dynamic performance during large-signal transient conditions while providing stable operation during steady state conditions.

The principle of capacitor charge balance has been utilized extensively for the purpose of steady state modeling and analysis of DC-DC converters. The principle of capacitor charge balance states that, in steady state, the average of the capacitor current over one switching period must be equal to zero. This condition must be satisfied in order for the output voltage to be equal at the beginning and end of a switching cycle. Equation (3) represents the principle of capacitor charge balance for a Buck converter under steady state conditions.

$$v_c(T_s) - v_c(0) = \frac{1}{C} \cdot i_{c_{avg}} = 0 \to \frac{1}{T_s} \int_0^{T_s} i_c(t) dt = 0 \quad (3)$$

By recognizing that the integral period of (3) may be extended over the total transient time of a DC-DC converter, equation (4) is developed.

$$v_c(t_b) - v_c(t_a) = \frac{1}{C} \cdot i_{c_{avg}} = 0 \to \frac{1}{t_b - t_a} \int_{t_a}^{t_b} i_c(t) dt = 0 \quad (4)$$

where $t_a$ represents the beginning of the transient period and $t_b$ represents the end of the transient period. Thus, if at $t_b$ the inductor current it equals the load current and (4) has been satisfied, the converter will enter its new steady state with minimal switchover.

In order for a converter to achieve the best possible dynamic response (e.g., lowest undershoot, shortest recovery time) to a positive load current step change, the following observations are made:

1. Following a positive load current step change, the inductor current can not change instantaneously and therefore a portion of the load current is supplied by the output capacitor. This in turn causes the capacitor voltage and the output voltage to decrease. In order to minimize the voltage drop, it is necessary for the inductor current to increase at its fastest possible slew rate immediately following the change. Therefore, the duty cycle of the control MOSFET must be initially set to its maximum.
2. The capacitor charge will be at its minimum at the moment the inductor current reaches the level of the output current. The inductor current will continue to rise, causing the capacitor to charge and the output voltage to increase.
3. At a specific point (to be determined), the duty cycle of the control MOSFET should be set to its minimum, in order to drive the inductor current toward its new steady state value.
4. In order to achieve the minimum possible settling time, the charge delivered to the capacitor $A_{charge}$ must be equal to the charge previously removed from the capacitor $A_{discharge}$ at the exact moment that the inductor current reaches its new steady state value. This is an objective of the control method described herein.

Figure 4:
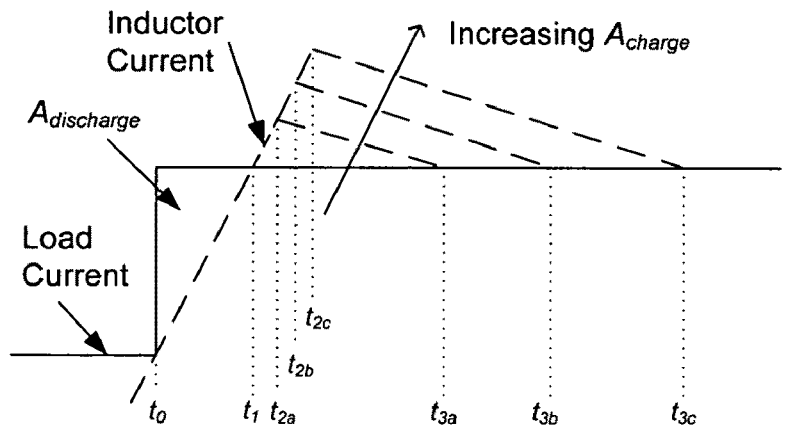
FIG. 4 shows inductor current paths and their effect on capacitor charge.

FIG. 3(a) illustrates the response of the controller to a positive load step, according to one embodiment of the invention. Two key points of the control method are:

1. Immediately detect the load current step and react by increasing the duty cycle of the control MOSFET. This may include setting the duty cycle to its maximum value.
2. Decrease the duty cycle at $t_2$. This may include setting the duty cycle to its minimum value. Time $t_2$ should be such that $A_{charge}$ will equal $A_{discharge}$ at time $t_3$. This will cause the output voltage to equal the reference voltage at the exact moment that the inductor current equals the load current. It is important to precisely predict the value of $t_2$ that optimizes performance because, as illustrated in FIG. 4, a small deviation in $t_2$ can result in a large deviation of $A_{charge}$.

Figure 3B:
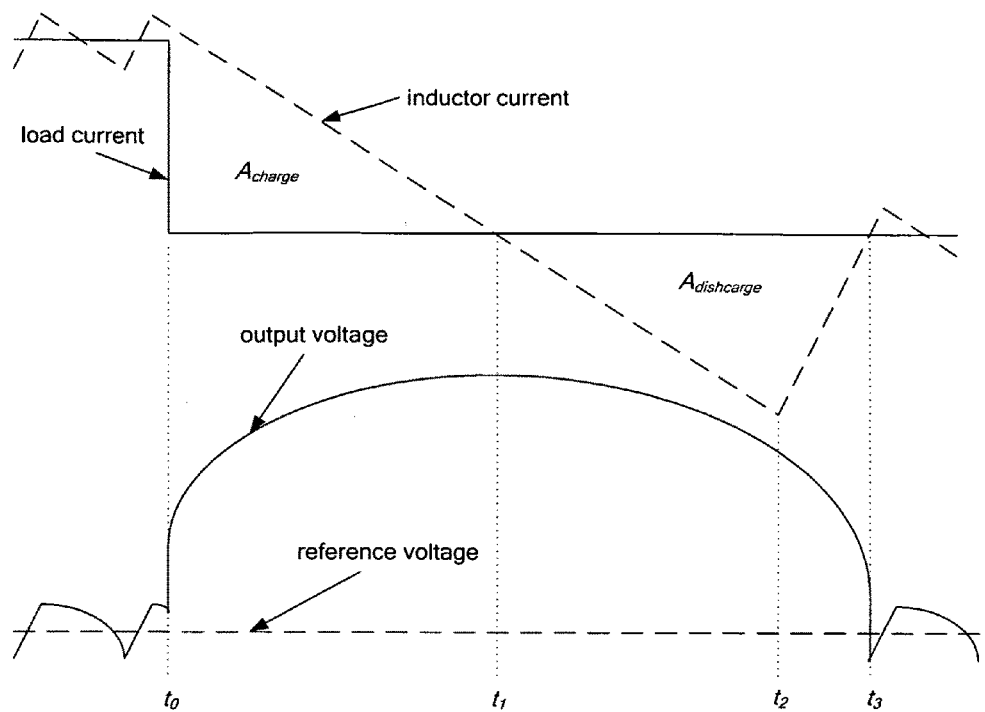

FIG. 3(b) illustrates the response of the controller to a negative load step, according to one embodiment of the invention. Two key points of the control method are:

1. Immediately detect the load current step and react by decreasing the duty cycle of the control MOSFET. This may include setting the duty cycle to its minimum value.
2. Increase the duty cycle at $t_2$. This may include setting the duty cycle to its maximum value. Time $t_2$ should be such that $A_{discharge}$ will equal $A_{charge}$ at time $t_3$. This will cause the output voltage to equal the reference voltage at the exact moment that the inductor current equals the load current. The controller is deactivated at $t_3$.

III. Mathematical Analysis of the Controller Response to a Positive Load Current Step FIG. 5 illustrates the charge and discharge areas for a positive load current step.

Figure 5:
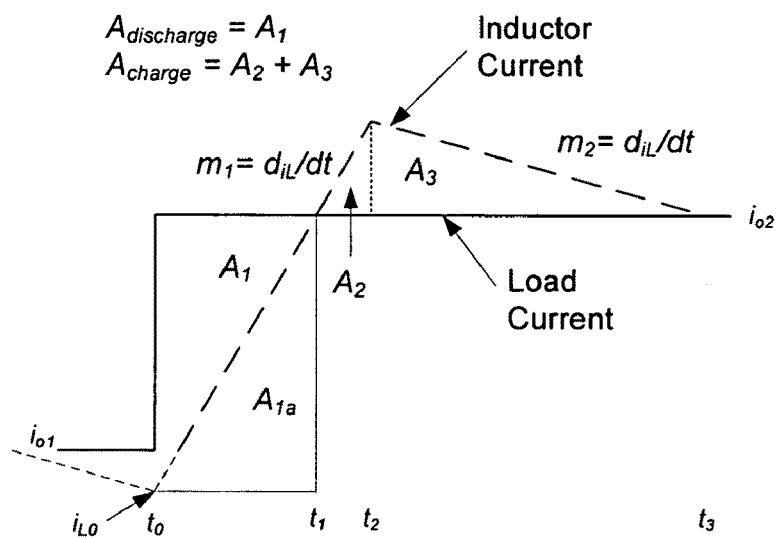
FIG. 5 shows the best possible inductor current response to a positive load current step, according to theoretical predictions.

For $t_0 < t < t_1$:

From FIG. 5 it is apparent that the total discharge area $A_1$ is equal to $A_{1a}$, thus equation (5) is true.

$$A_1 = \int_{t0}^{t1} [i_{o2} - i_L(t)] dt = A_{1a} = \int_{t0}^{t1} [i_L(t) - i_{L0}] dt \quad (5)$$

$m_1$ represents the rate at which $i_L(t) - i_{L0}$ is increasing, such that equations (6) and (7) are true.

$$m_1 = \frac{d[i_L(t) - i_{L0}]}{dt} \quad (6)$$

$$i_L(t) - i_{L0} = \int_{t0}^{t} m_1 dt \quad (7)$$

Therefore, by combining equations (5) and (7), the total discharge area $A_{discharge}$ can be expressed in (8).

$$A_{discharge} = A_1 = A_{1a} = \int\int_{t1-t0} m_1 (dt)^2 \quad (8)$$

For $t_1 < t < t_2$:

The charge area $A_2$ is expressed in equation (9).

$$A_2 = \int_{t1}^{t2} [i_L(t) - i_{o2}] dt \quad (9)$$

By inspection, $m_1$ also represents the rate that $i_L(t) - i_{o2}$ is increasing, as expressed in equations (10) and (11).

$$m_1 = \frac{d[i_L(t) - i_{o2}]}{dt} \quad (10)$$

$$i_L(t) - i_{o2} = \int_{t1}^{t} m_1 dt \quad (11)$$

Therefore, by combining equations (9) and (11), the charge area $A_2$ can be expressed as equation (12).

$$A_2 = \int\int_{t2-t1} m_1 (dt)^2 \quad (12)$$

From geometry, a relationship for $A_2$ and $A_3$ is found in equation (13), in terms of the rising and falling slew rates of the inductor current.

$$\frac{A_3}{A_2} = \frac{m_1}{-m_2} \quad (13)$$

Thus, by combining equations (12) and (13), an expression for the total charge area $A_{charge}$ is presented in equation (14).

$$A_{charge} = A_2 + A_3 \quad (14)$$

$$= \int\int_{t2-t1} m_1(dt)^2 + \int\int_{t2-t1} \frac{m_1^2}{-m_2}(dt)^2$$

$$= \int\int_{t2-t1} \frac{m_1 m_2 - m_1^2}{m_2}(dt)^2$$

By using equation (14), it is possible to predict the total charge area at time $t_2$. In order to satisfy the principle of capacitor charge balance at $t_3$, equation (15) must be true.

$$A_{discharge} - A_{charge} = 0 \quad (15)$$

$$\int\int_{t1-t0} m_1(dt)^2 - \int\int_{t2-t1} \frac{m_1 m_2 - m_1^2}{m_2}(dt)^2 = 0$$

$$m_1 \int\int_{t1-t0} (dt)^2 - \frac{m_1 m_2 - m_1^2}{m_2}\int\int_{t2-t1} (dt)^2 = 0$$

$$\int\int_{t1-t0} (dt)^2 - \frac{m_2 - m_1}{m_2}\int\int_{t2-t1} (dt)^2 = 0$$

The inductor current slew rates of a Buck converter are known ($m_1=(V_{in}-V_o)/L$; $m_2=-V_o/L$) and are substituted into (15) to yield equation (16).

$$A_{discharge} - A_{charge} = 0 \quad (16)$$

$$\int\int_{t1-t0} (dt)^2 - \frac{m_2 - m_1}{m_2}\int\int_{t2-t1} (dt)^2 = 0$$

$$\int\int_{t1-t0} (dt)^2 - \frac{-\frac{V_o}{L} - \frac{(V_{in}-V_o)}{L}}{-\frac{V_o}{L}}\int\int_{t2-t1} (dt)^2 = 0$$

$$\int\int_{t1-t0} (dt)^2 - \frac{V_{in}}{V_o}\int\int_{t2-t1} (dt)^2 = 0$$

Since analog division is costly, the equation is simplified by multiplying $V_o$ to both sides, as expressed in equation (17).

$$A_{discharge} - A_{charge} = 0 \quad (17)$$

$$V_o \int\int_{t1-t0} (dt)^2 - V_{in}\int\int_{t2-t1} (dt)^2 = 0$$

Figure 6A:
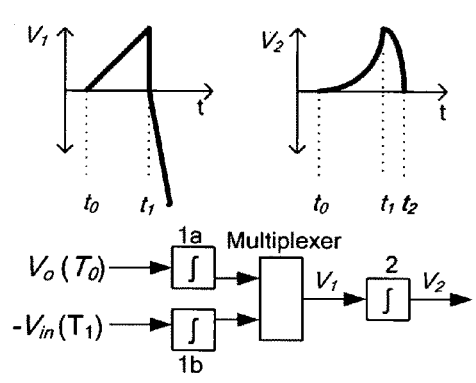
FIGS. 6(a) and (b) show block diagrams and related waveforms of a double integrator used to predict $t_2$ for a positive load step and a negative load step, respectively.

From equation (17), it can be seen that an analog double integrator may be used to calculate the time $t_2$ that will allow $A_{charge}-A_{discharge}$ to equal zero when the inductor current reaches the new load current (at $t_3$). This is illustrated in FIG. 6(a).

In the case of a positive load current step, the duty cycle may be set to zero when $V_2$ equals zero (at time $t_2$). This allows the inductor current to fall and reach the output current at the exact moment that the charge removed from the capacitor equals the charge delivered to the capacitor.

Figure 6B:
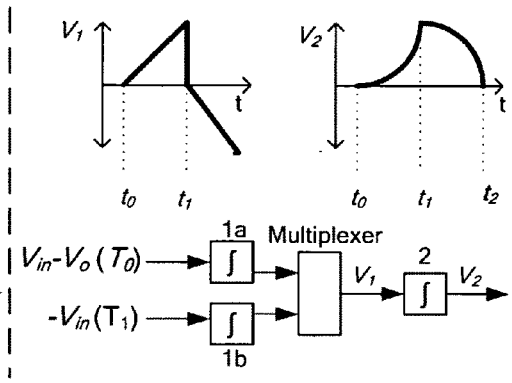

A similar analysis was performed for a negative current step change. The result of the analysis is expressed in equation (18), and is illustrated in FIG. 6(b).

$$A_{charge} - A_{discharge} = 0 \quad (18)$$

$$(V_{in} - V_o)\int\int_{t1-t0} (dt)^2 - V_{in}\int\int_{t2-t1} (dt)^2 = 0$$

In the case of a negative load current step, the duty cycle may be set to 100% when $V_2$ equals zero (at time $t_2$). This allows the inductor current to increase and reach the output current at the exact moment that the charge removed from the capacitor equals the charge delivered to the capacitor.

IV. Operation of the Controller

Figure 7:
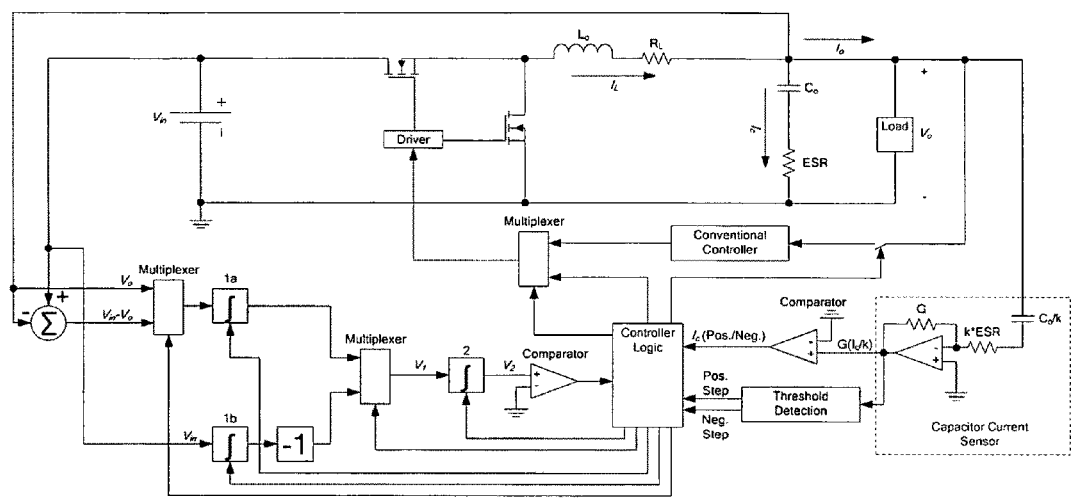
FIG. 7 is a block diagram of a controller according to an embodiment of the invention.
Figure 8:
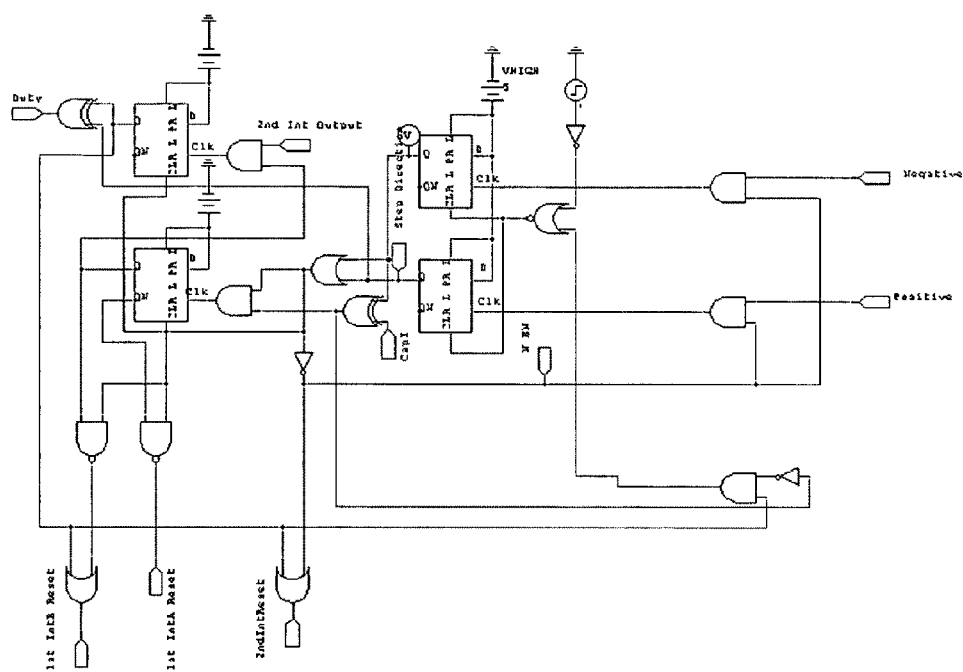
FIG. 8 is an example of control logic for the embodiment of FIG. 7.

FIG. 7 illustrates a block diagram of an embodiment of a controller according to the invention, with a Buck converter. The controller may be implemented in any suitable manner (i.e., analog or digital). An example of logic for an analog implementation is shown in FIG. 8, which is the configuration used in the simulations described below.

Figure 9A:
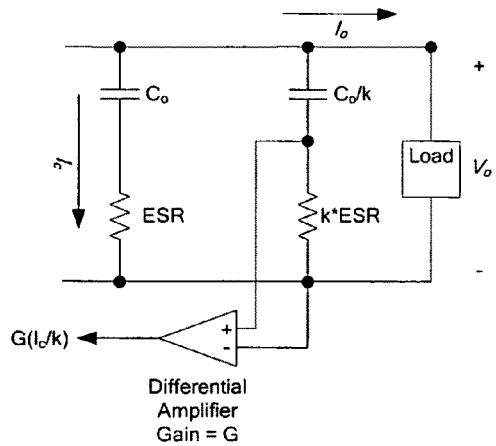
FIGS. 9(a) and (b) show parallel and series differential capacitor current sensors, respectively.
Figure 9B:
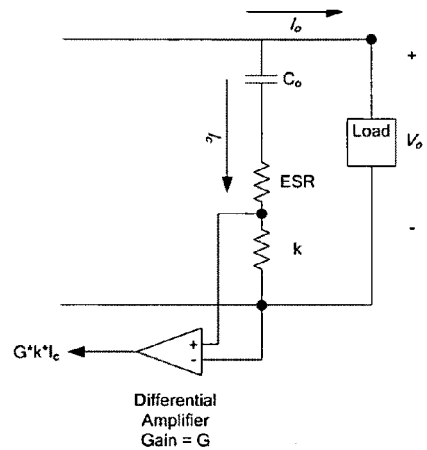
FIG. 9(c) shows a trans-impedance capacitor current sensor for multiple types of capacitors.

The controller indirectly senses the capacitor current using, for example, a non-invasive trans-impedance amplifier, connected to the output voltage (as shown in FIG. 7). Alternative capacitor current sensing topologies may be used, such as the parallel and series differential configurations depicted in FIGS. 9(a) and 9(b) respectively.

Figure 9C:
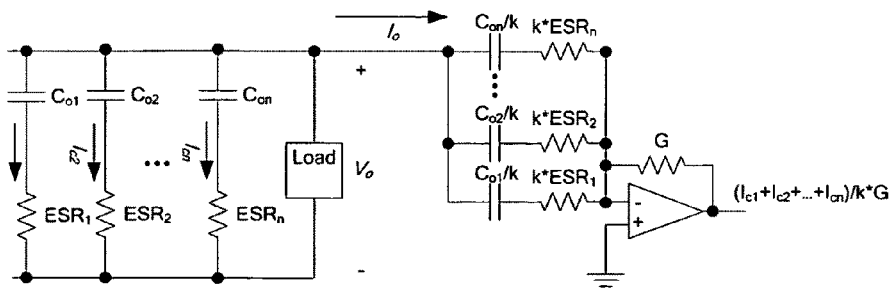

FIG. 9(c) shows an embodiment of a trans-impedance capacitor current sensor that may be employed when various types of capacitors are utilized for the output of the converter. For example, multiple types of capacitors (with different C and ESR values) may be used. Each branch connected to the inverting input of the operational amplifier (op amp) corresponds to each type of capacitor used, as shown in FIG. 9(c). For example, if the Buck output capacitor bank was made up of 20 identical ceramic capacitors and 10 identical electrolytic capacitors, there would be two resistor-capacitor branches connected to the inverting input of the op amp.

Operation of the controller and its logic is described below.

Figure 10A:
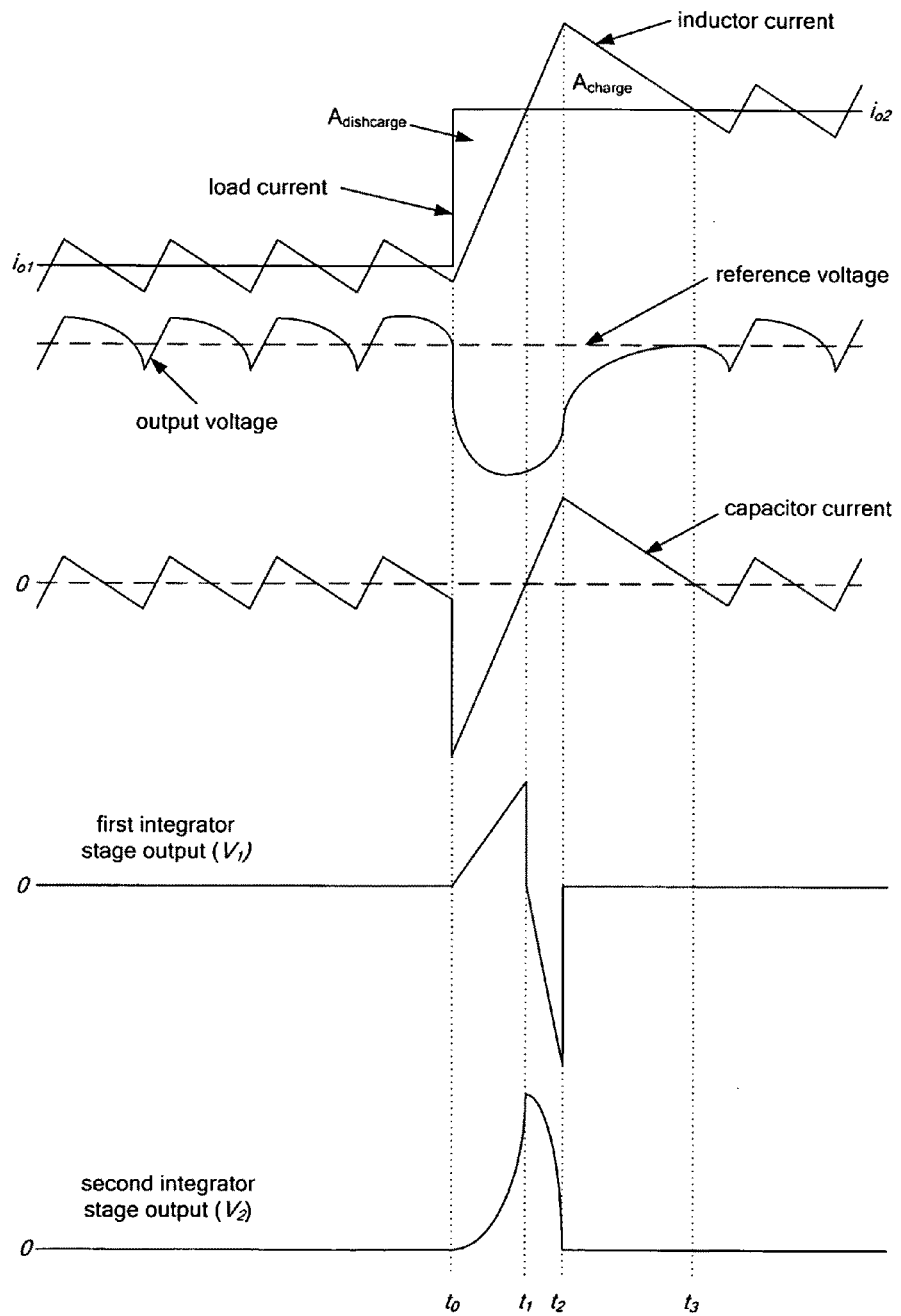
FIGS. 10(a) and (b) show key waveforms demonstrating operation of the controller for positive and negative load current steps, respectively.
Figure 10B:
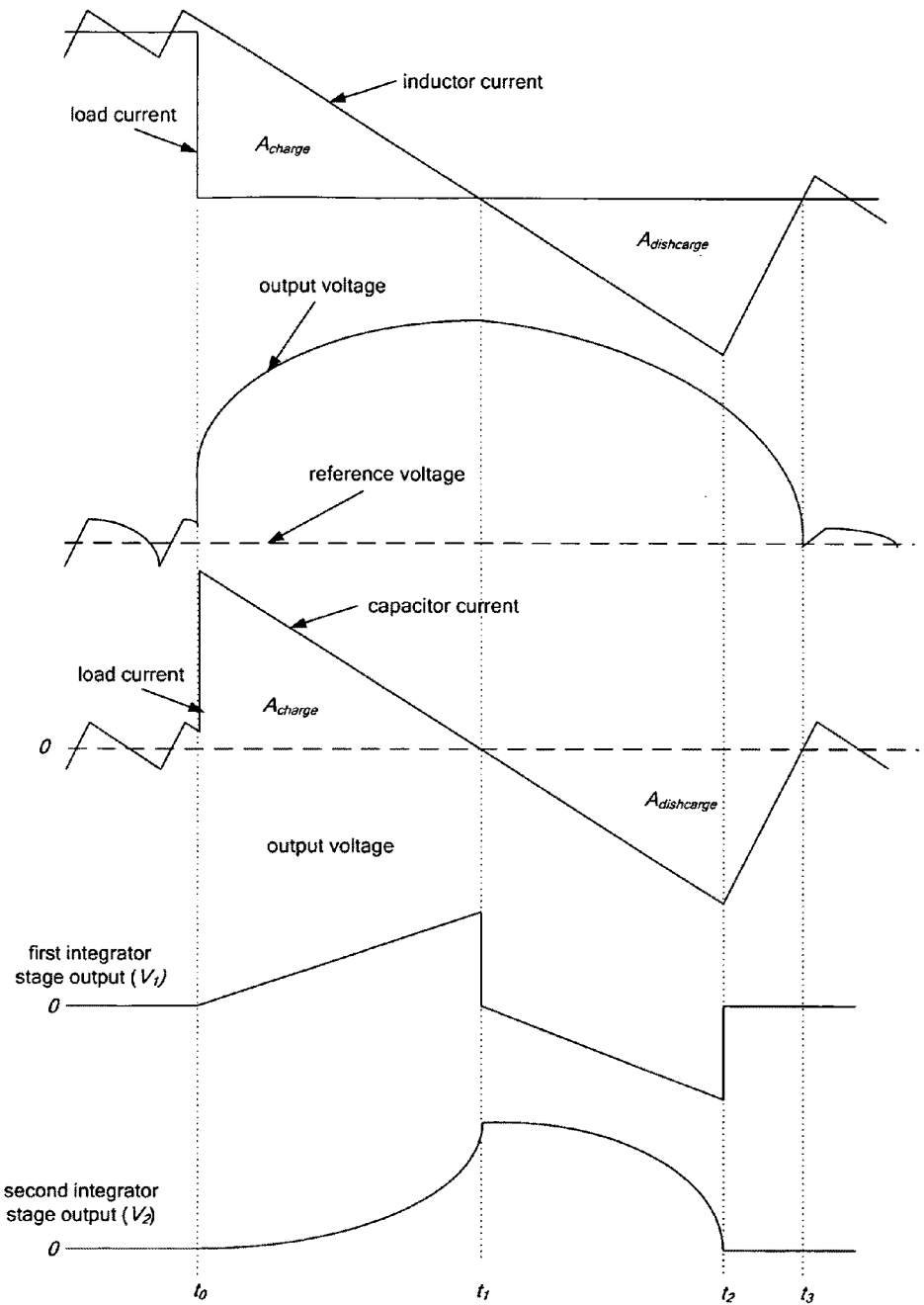

The converter switches from conventional operation to operation according to an embodiment of the invention immediately following a current step change. Key waveforms of the controller operation are illustrated in FIG. 10(a) for a positive output current step, and in FIG. 10(b) for a negative output current step. The controller operation may be described in four steps.

Step 1: Detect Current Step Change ($t_0$)

The controller indirectly senses the capacitor current. When the capacitor current exceeds a predetermined threshold, the controller will immediately change the duty cycle to 100% (for a positive step change), or 0% (for a negative step change).

The controller logic will release the "reset" switch of integrator 1a and integrator 2 (see FIG. 7). The output of integrator 1a will begin to increase linearly with a slope of $V_o$ (for a positive step change), or $V_{in}-V_o$, (for a negative step change). The output of integrator 2 will begin to increase exponentially.

Step 2: Detect Capacitor Current Cross-Over ($t_1$)

A comparator, fed by the capacitor current sensor, is used to determine the point at which the capacitor current changes direction. This point indicates that the inductor current reaches the new load current as illustrated in FIG. 10(a) or (b), point $t_1$. At this point, integrator 1a will be "reset" and integrator 1b will be activated. The output of integrator 1b will begin to decrease linearly with a slope of $-V_{in}$. The output of integrator 2 will begin to decrease exponentially.

Step 3: Alter Duty Cycle ($t_2$)

At the moment that the output of integrator 2 returns to zero (at $t_2$), the duty cycle will be set to 0% (for a positive load step change) or 100% (for a negative load step change). At this point, the inductor current will be at its maximum (in the case of a positive load step change) or its minimum (in the case of a negative load step change). The inductor current will begin to decrease toward the new load current in the case of a positive load step change. In the case of a negative load step change, the inductor current will begin to increase toward the new load current.

Step 4: De-Activate Controller ($t_3$)

At $t_3$, the inductor current reaches the new load current (determined by a second capacitor current switchover) and the output voltage returns to its reference value. At this point, the controller deactivates and the conventional controller resumes control of the converter.

V. Improved Dynamic Performance with Modified Converter Topology

The control method described above effectively allows a DC-DC converter to achieve improved dynamic response under both positive and negative load current steps. Another aspect of the invention relates to a converter circuit topology and control method for further improving dynamic performance of a DC-DC converter in response to a load current step. The topology and control method relate to a Buck converter and Buck-derived converters such as forward, push-pull, half-bridge, and full-bridge converters.

Buck converters are utilized extensively in voltage regulator modules (VRMs) for microprocessors. VRMs typically must convert a high input voltage (e.g., 12 V) to a relatively small output voltage (approximately 1.0 V-1.5 V). Under the control method described herein, the primary limiting factor of dynamic performance is the slew rate of the output inductor. As previously mentioned, the inductor current slew rate is known ($di_L/dt=(V_{in}-V_o)/L$ for rising current; $di_L/dt=-V_o/L$ for falling current). Since for a typical VRM, the magnitude of $(V_{in}-V_o)/L$ is significantly larger than $-V_o/L$, the dynamic performance of a positive load current step will be far superior than that of a negative load current step. For VRM applications, the voltage overshoot caused by a negative current step may be more than 5 times as large as the corresponding voltage undershoot caused by a positive current step of equal magnitude.

Figure 11A:
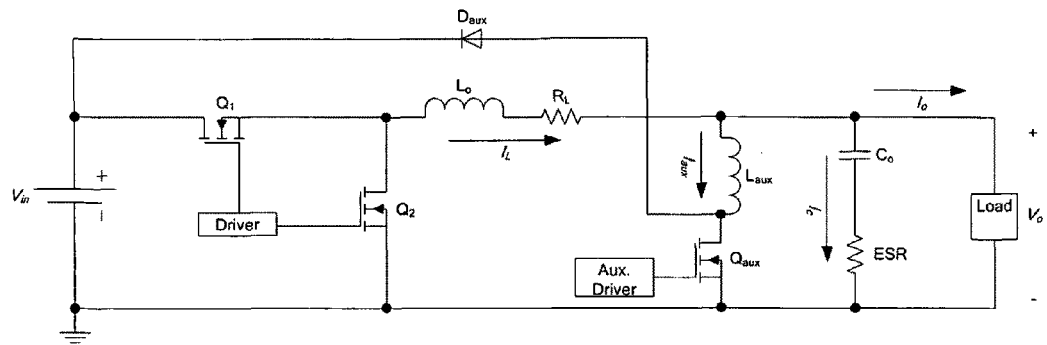
FIGS. 11(a) to (c) show circuit diagrams of a modified Buck converter having an auxiliary branch for improved dynamic performance in response to a negative load current step (FIG. 11(a)), a positive load current step (FIG. 11(b)), and both positive and negative load current steps (FIG. 11(c))
Figure 11B:
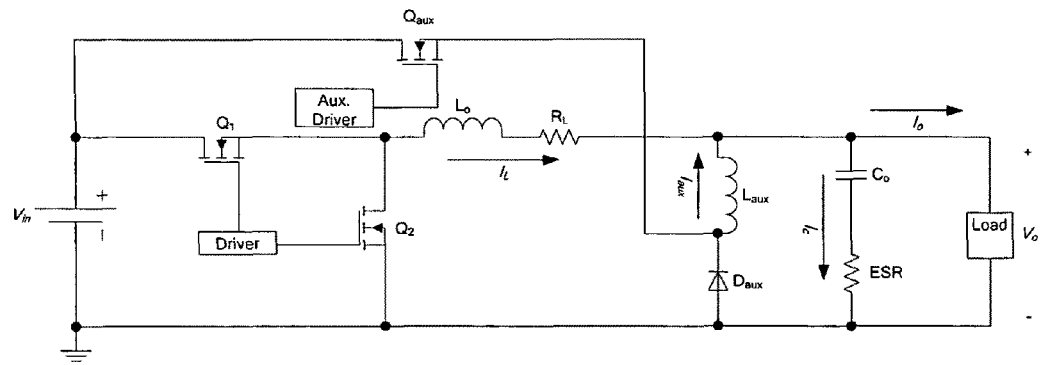

For example, to improve dynamic performance during a negative load current step, the converter topology modification shown in FIG. 11(a) may be used. During a negative load current step the modification functions to divert a portion of the inductor current from reaching the output capacitor. Referring to FIG. 11(a), a synchronous Buck converter is modified by adding a current source in parallel with the parallel output capacitor. The current source, which is also referred to herein as an auxiliary branch, may include in series an inductor and a switch. The switch may be, for example, a MOSFET. The current source also includes a diode connected from the voltage input of the converter to the drain of the current source switch. In an alternative embodiment, the diode may be replaced with a MOSFET for synchronous operation, as shown in FIGS. 11(b) and (c).

When a negative load current step is detected by the controller, the controller will decrease the duty cycle of the control switch of the converter. For example, the controller may set the duty cycle of the control switch of the converter to 0%. To decrease the voltage overshoot, the controller will activate the auxiliary branch of the converter. The auxiliary switch is driven at a switching frequency higher than $f_s$. The auxiliary switch may be controlled such that controlled average current is present through the auxiliary branch. The auxiliary branch controller function may be, for example, current-mode hysteretic, peak current mode (e.g., constant switching frequency or constant off-time), average current mode, or constant duty cycle. The amplitude of the current through the auxiliary branch may be chosen for a desired dynamic response, as described in detail in Example 2, below. A larger auxiliary branch current will further improve the dynamic response but will require a higher-current auxiliary MOSFET. The auxiliary controller may be provided together with a conventional controller for the control and synchronous switches of the controller. Alternatively, the auxiliary controller may be provided separately from the conventional controller, as shown in the embodiment of FIG. 11(d). In such an embodiment, the auxiliary branch may be implemented separately to a pre-existing, arbitrary buck-derived converter.

Figure 12A:
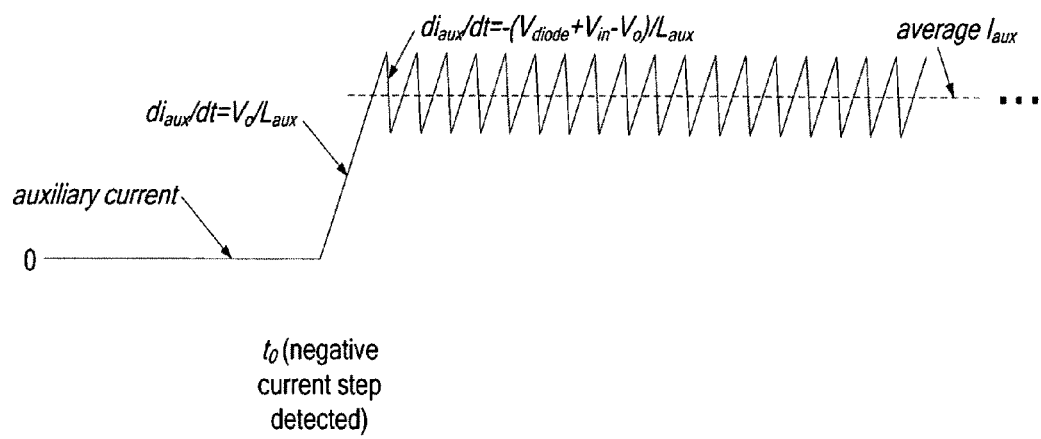
FIGS. 12(a) and (b) show the auxiliary current $I_{aux}$ waveform for the circuit of FIG. 11(a) when the auxiliary branch is activated.
Figure 12B:
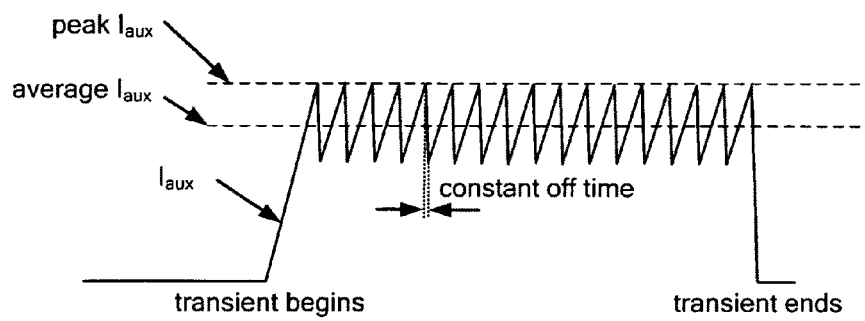

FIG. 12(a) shows the auxiliary current $I_{aux}$ in one embodiment when the branch is activated. In another embodiment, the auxiliary branch may be controlled using a peak-current mode, constant off-time scheme. FIG. 12(b) shows the auxiliary current for such an embodiment. The auxiliary current may be sensed using, for example, the MOSFET $R_{ds\_on}$, a current sense resistor, or an RC network in parallel with the inductor.

For example, the embodiment of FIG. 11(a) may be controlled using a peak-current mode ($I_{aux\_peak}$), constant off-time ($t_{off}$) scheme as shown in FIG. 12(b). In the auxiliary branch the inductor $L_{aux}$ may be chosen to be much smaller (e.g., 1/10) than the output inductor $L_o$ of the converter. Due to the short duration of operation, $Q_{aux}$ may be chosen based on its pulsed current limit (allowing for the use of, for example, SOT-23 MOSFETs for $I_{aux\_avg}$<15 A). Since the duty cycle of the diode is typically very small (<15%), a small (average current rating approximately equal to $0.15*I_{aux\_avg}$) Schottky diode may be used. $I_{aux\_peak}$ and $t_{off}$ may be chosen based on the desired values of $I_{aux\_avg}$ and $f_{aux}$ as shown in equations (19) and (20) respectively.

$$i_{aux\_avg} = \frac{2 \cdot i_{aux\_peak} \cdot L_{aux} - (V_{in} + V_{diode} - V_o) \cdot t_{off}}{2 \cdot L_{aux}} \quad (19)$$

$$f_{aux} \approx \frac{V_o - Rds_{on} \cdot i_{aux\_avg}}{t_{off}(V_{in} + V_{diode} - Rds_{on} \cdot I_{avg})} \quad (20)$$

Figure 13A:
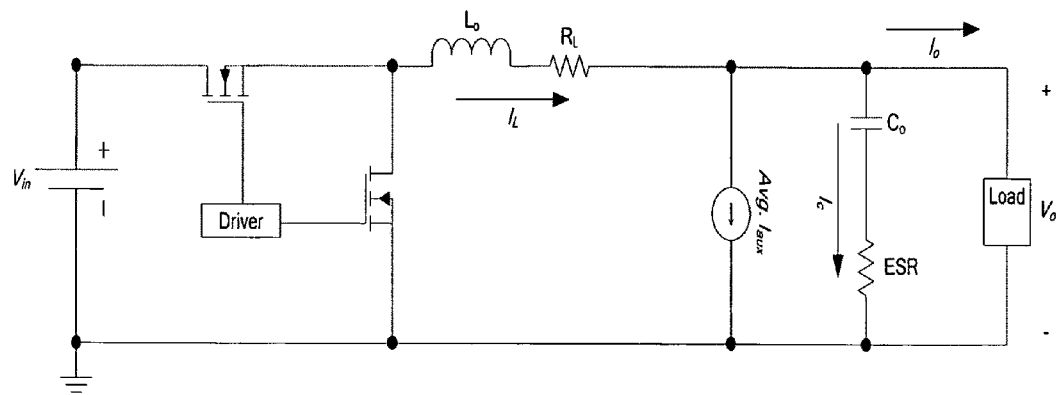
FIG. 13(a) shows an equivalent circuit diagram of a Buck converter modified for current diversion.
Figure 13B:
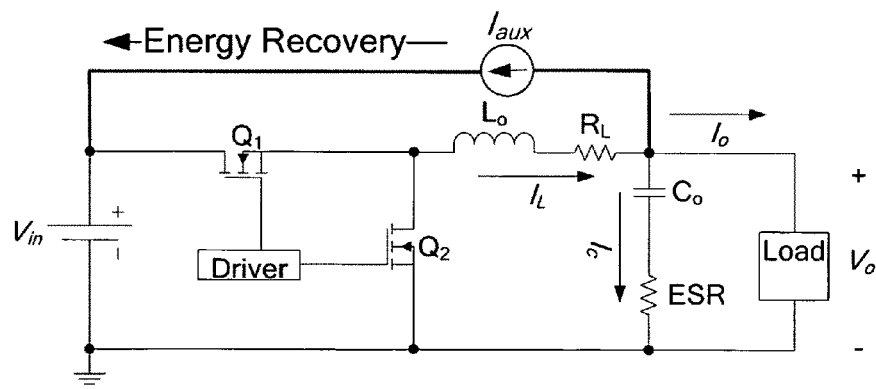
FIG. 13(b) is a circuit diagram showing diversion of current to the input voltage terminal for the Buck converter of FIG. 11(a)

The auxiliary branch improves dynamic performance during a negative current step by diverting a portion of the excess inductor current, thereby preventing it from reaching the output capacitor. Therefore, the output capacitor receives less charge during the first portion of the transient period. When the auxiliary branch is activated, the modified Buck converter may be modelled as in FIG. 13(a), which shows the general case for current diversion. FIG. 13(b) shows a practical implementation, in which current is diverted to the input voltage terminal.

The above discussion relates to the situation where the current in the auxiliary branch is used to divert the output inductor current so as to reduce the output voltage overshoot when the load current undergoes a negative step. However, as will be understood by one of ordinary skill in the art, if the direction of the auxiliary current source is reversed, then the current in the auxiliary branch may be used to supplement the output inductor current, so as to reduce the output voltage undershoot when the load current undergoes a positive step. An example of such an embodiment is shown in FIG. 11(b). In this circuit, the MOSFET $Q_{aux}$ is controlled such that the auxiliary inductor current $I_{aux}$ is also used to charge the output capacitor.

Figure 11C:
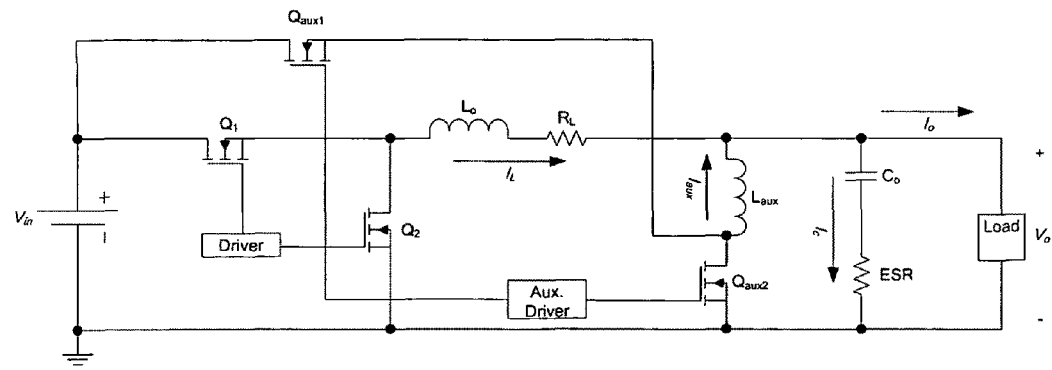
Figure 11D:
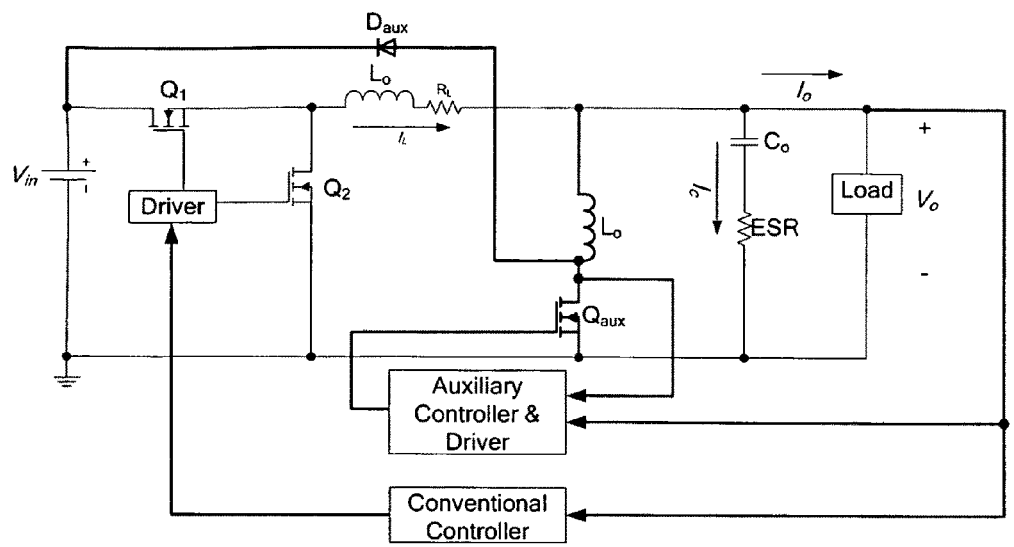
FIG. 11(d) shows an embodiment of the circuit of FIG. 11(a) with separate auxiliary branch and conventional controllers.

In another embodiment, shown in FIG. 11(c), the diode $D_{aux}$ is replaced with a synchronous rectifier, to reduce conduction loss. In this embodiment, when MOSFET $Q_{aux2}$ is used as the control switch, the current in the auxiliary branch $I_{aux}$ will flow from top to bottom (i.e., as shown by the arrow in FIG. 11(a)), which is suitable for a negative load current step. When MOSFET $Q_{aux1}$ is used as the control switch, the current in the auxiliary branch $I_{aux}$ will flow from bottom to top (i.e., as shown by the arrow in FIG. 11(c)), which is suitable for a positive load current step. In this embodiment, the same branch may be used to improve the dynamic response for both negative and positive load steps. The average auxiliary current need not be equal for negative step and positive step scenarios. Further embodiments will be apparent to those of skill in the art.

Methods of controlling the auxiliary branch in response to both positive and negative load current steps will be apparent to those skilled in the art. Examples of four methods for controlling the auxiliary branch in response to a negative load current step are given below. However, the invention is not limited to these examples.

Example 1

Charge Balance Auxiliary Branch Controller

Figure 14:
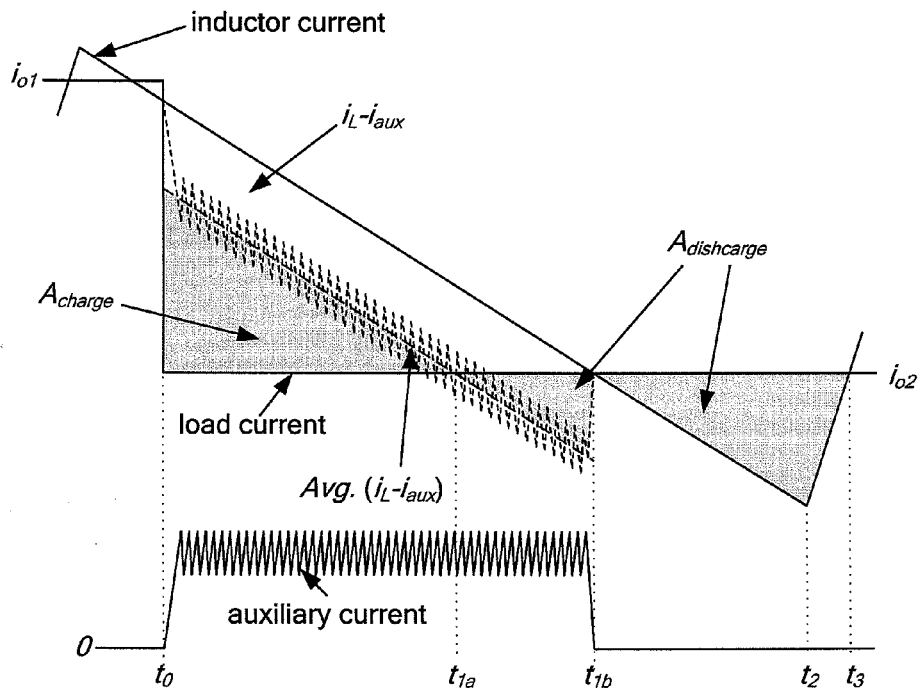
FIG. 14 shows the transient response of the circuit of FIG. 11(a) to a negative load current step under one control embodiment.

The principle of capacitor charge balance may be used to ensure that the output voltage and the inductor current reach steady state simultaneously and in the minimum possible time. FIG. 14 shows the transient response to a negative current step under the proposed control method.

It is observed in FIG. 14 that the capacitor charge portion $A_{charge}$ may now be approximated by equation (21).

$$A_{charge} = \int_{t0}^{t1a} [i_L(t) - i_{aux\_avg} - i_{o2}] dt \quad (21)$$

Thus $A_{charge}$, and subsequently the voltage overshoot, is significantly reduced due to the current in the auxiliary branch. It is apparent in FIG. 14 that the topology can be controlled effectively by the abovementioned control method with minor modifications. In order for the control method to function correctly, it must detect the crossover point of $i_L - i_{aux\_avg} - i_o$, and the crossover point of $i_L - i_o$. At $t_{1b}$, when the $i_L - i_o$ crossover point is detected, the auxiliary circuit is disabled; however, the duty cycle of the control switch remains at 0% for the time period $t_{1b} - t_2$.

Figure 15:
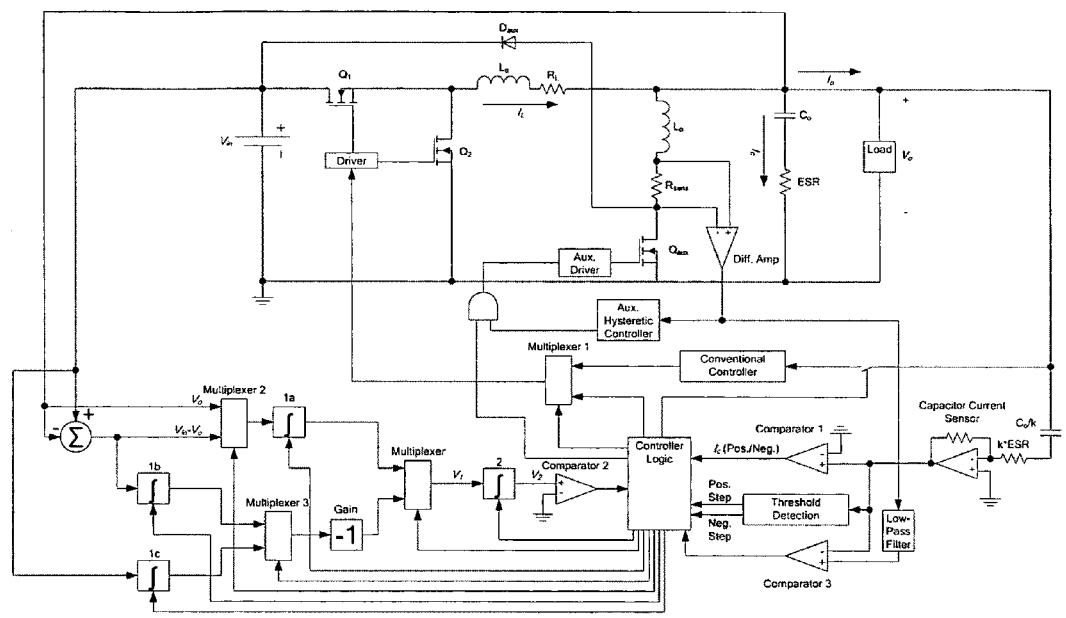
FIG. 15 is a block diagram of a modified controller for the auxiliary branch of the circuit of FIG. 11(a)

FIG. 15 shows a block diagram of an embodiment of the modified control method. The control schematic in FIG. 15 is very similar to that of FIG. 7. An additional comparator (comparator 3) is implemented to detect the $i_L - i_{aux\_avg} - i_o$ zero-crossover point.

By referring to FIG. 15 and performing similar calculations to that of section III, it is found that the charge and discharge portions are balanced if equation (22) is satisfied.

$$A_{charge} - A_{discharge} = 0 \quad (22)$$

$$(V_{in} - V_o)\int\int_{t1a-t0}(dt)^2 - (V_{in} - V_o)\int\int_{t1b-t1a}(dt)^2 - V_{in}\int\int_{t2-t1b}(dt)^2 = 0$$

Figure 16:
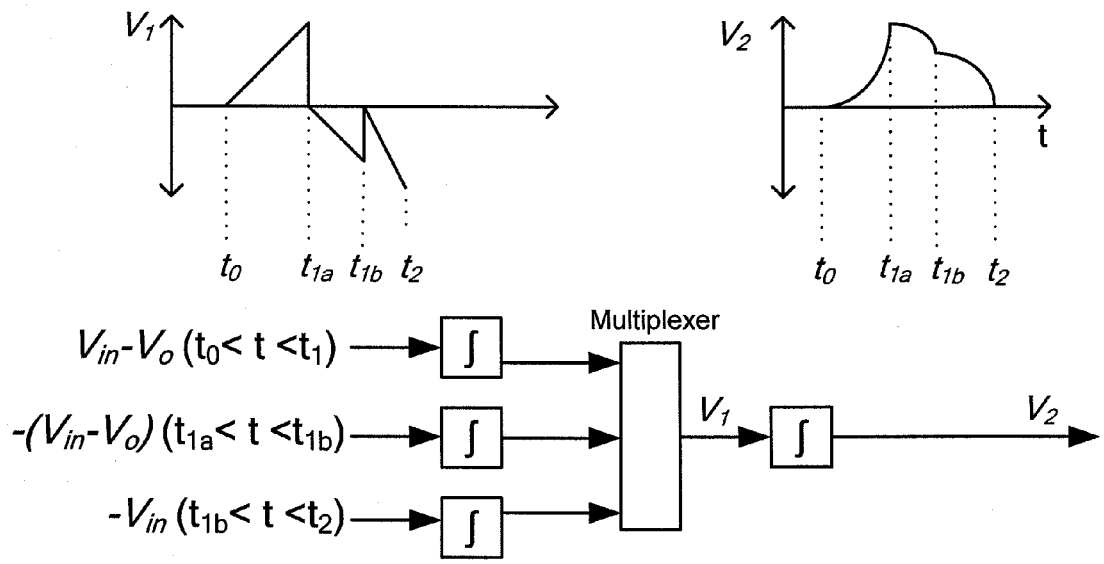
FIG. 16 shows the integrator operation of the circuit of FIG. 15.

Therefore, it is apparent that an additional integrator (integrator 1c) is required to predict $t_2$. FIG. 16 illustrates the additional integrator operation. For the above control method to function correctly, the inductor current must reach the new load current before the output voltage returns to its nominal value. This criterion adds a constraint to the maximum allowable auxiliary current.

Example 2

Simplified Auxiliary Branch Controller

Figure 18A:
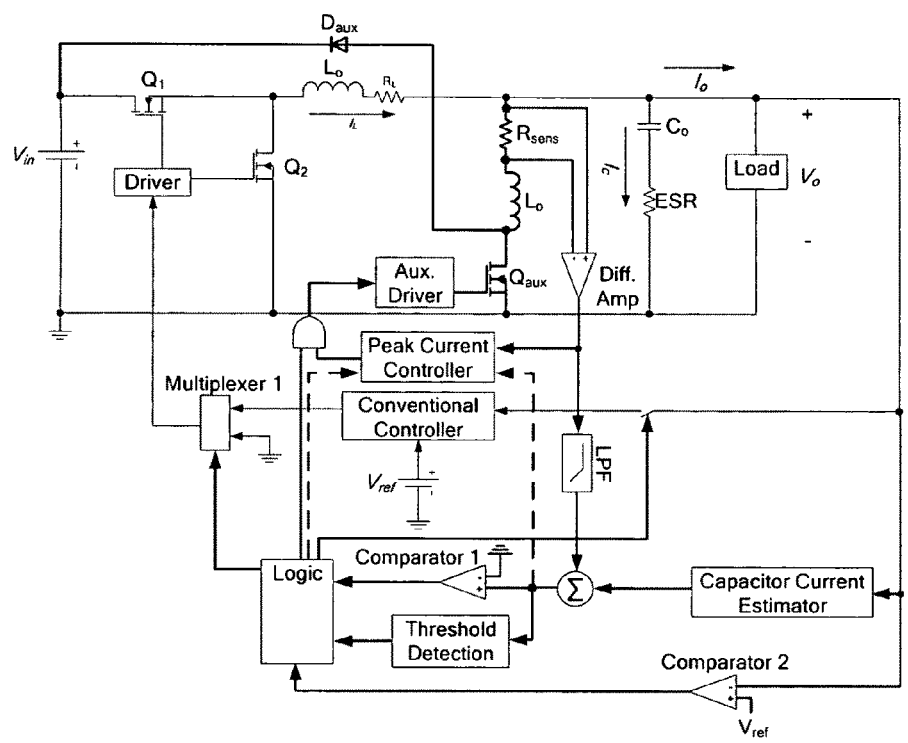
FIGS. 18(a) and (b) are block diagrams of embodiments of simplified controllers for the circuit of FIG. 11(a)
Figure 18B:
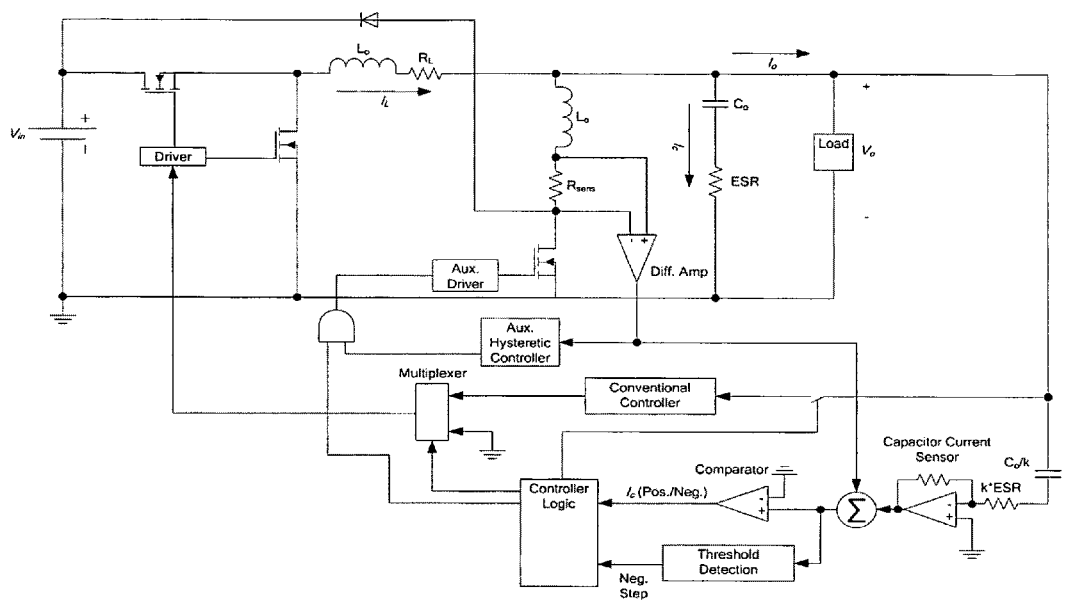
FIGS. 18(c) and (d) show embodiments of circuits for estimating the capacitor current with minimal ESL effect.
FIGS. 18(e) to (g) show waveforms for embodiments of operation of the controller circuit of FIG. 18(a) for reactivation of conventional control of the converter of FIG. 11(a)
Figure 18C:
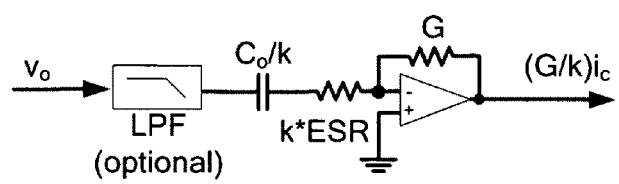
Figure 18D:
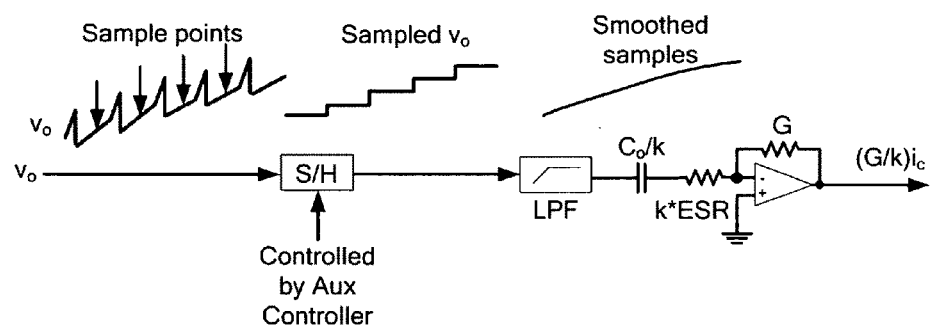
Figure 18E:
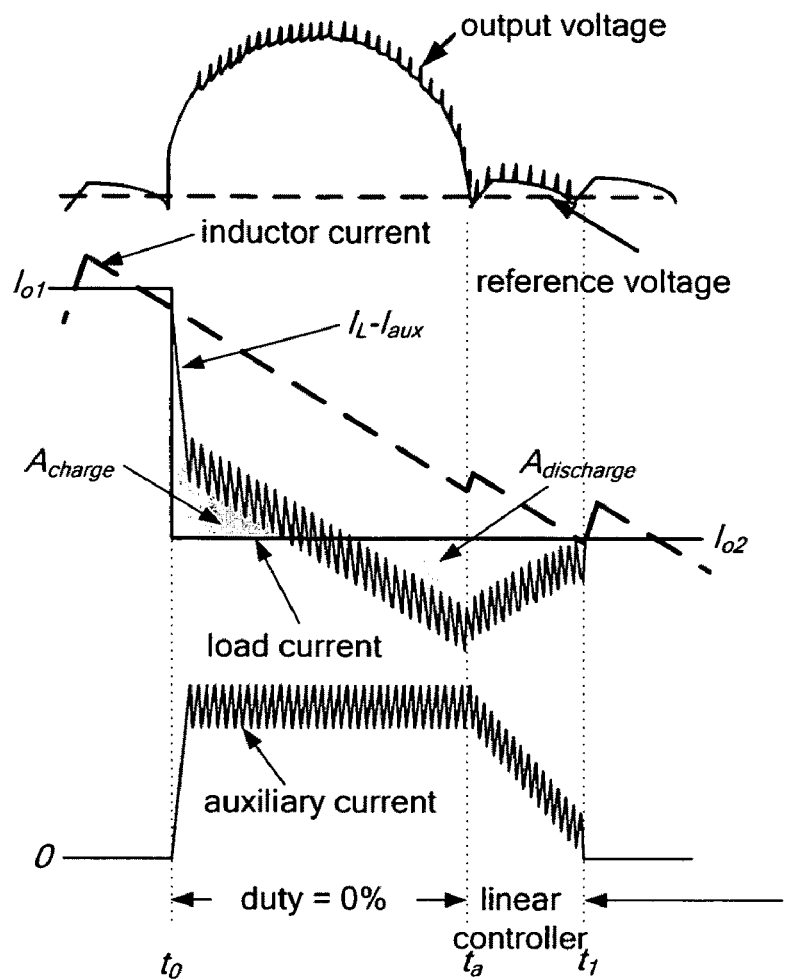
Figure 18F:
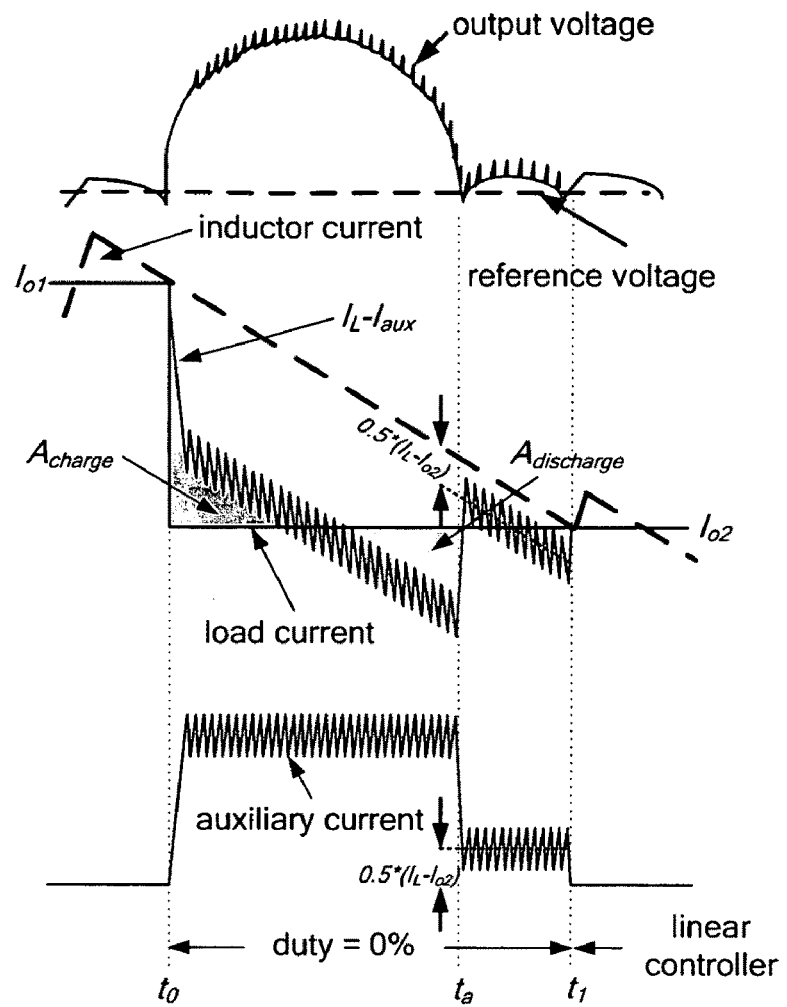
Figure 18G:
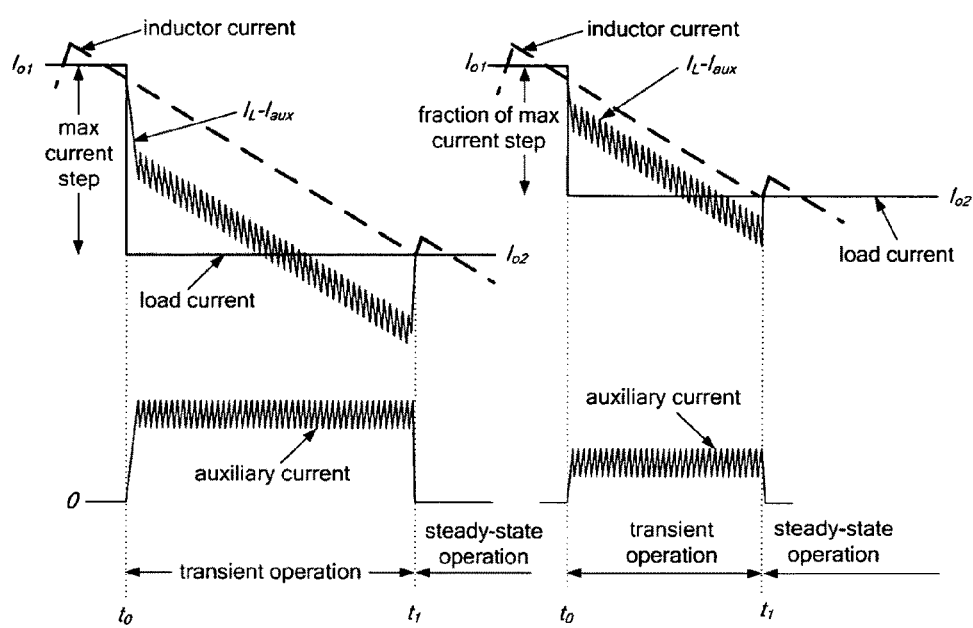

The above-mentioned controller may be greatly simplified by slightly sacrificing settling time. The simplified controller functions similarly to the controllers described above; however, it does not employ charge balance techniques, and at the point when the inductor current equals the new load current, the auxiliary branch is disabled and the control is returned to the conventional controller (e.g., voltage mode, current mode, or hysteresis mode controller). This method eliminates the need for integrators or an extra comparator. FIGS. 18(a) and (b) show block diagrams of two embodiments of such a simplified controller. In FIG. 18(a), connections shown in dashed lines are optional.

To reduce the impact of high frequency output voltage ripple caused by the equivalent series inductance (ESL) of the output capacitor, a low-pass filter (with corner frequency set below the auxiliary switching frequency) may be placed at the output of the auxiliary current differential amplifier and/or the input of the capacitor current sensor. For example, in the embodiment of FIG. 18(a), a low pass filter is connected between the output of the auxiliary current differential amplifier and the summer.

Figure 17A:
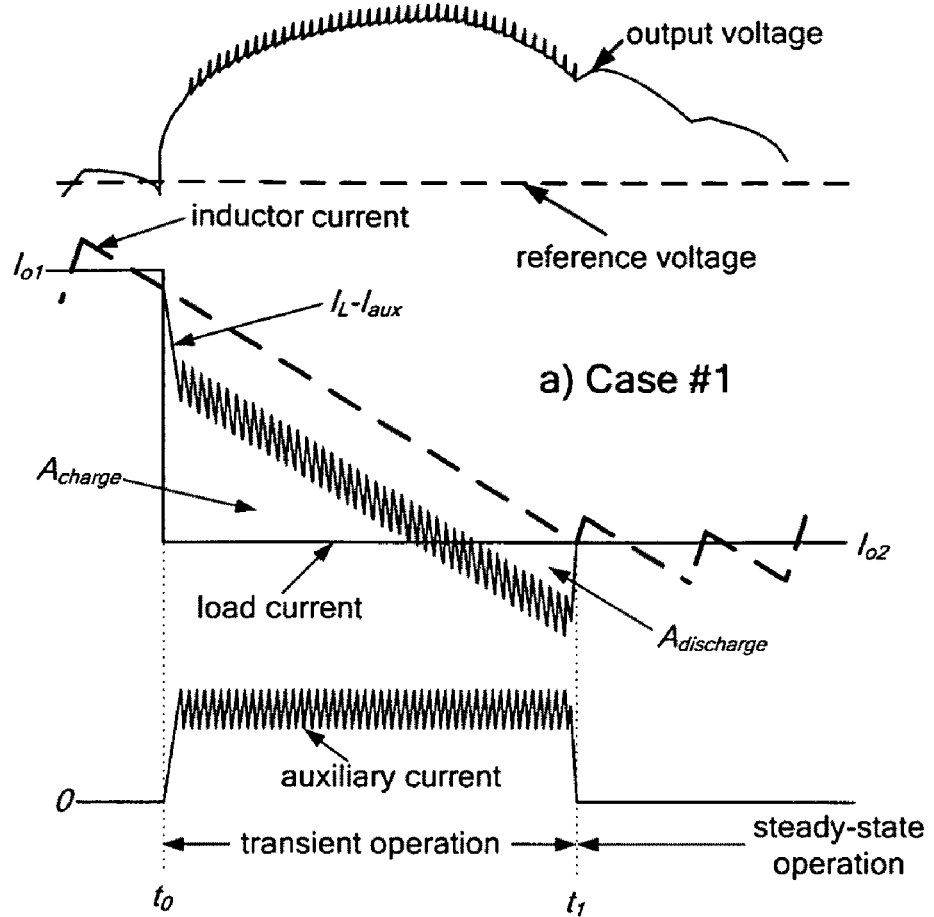
FIGS. 17(a) and (b) show dynamic performance of the simplified controller circuit of FIG. 18(b)

Operation of the circuit of FIG. 18(a) is described below, in response to a negative step load, with reference to FIGS. 17(a) (Case # 1) and 17(b) (Case #2). Case #1 is where the output voltage does not return to the reference voltage before the inductor current reaches the new load current, and Case #2 is where the output voltage returns to the reference voltage before the inductor current equals the new load current.

$t_0$: Step-Down Load Transient Detected (Case #1 and Case #2)

When the output capacitor current exceeds a pre-determined threshold, the auxiliary branch is activated and the duty cycle of the control switch of the converter is set to 0%. The duty cycle of the conventional controller is held constant to prevent loop upsetting.

To attenuate the ESL noise due to the high-frequency switching of the auxiliary circuit, a capacitor current estimator may be employed. FIG. 18(*c*) shows one embodiment of the capacitor current estimator, in which a trans-impedance amplifier with an input impedance proportional to that of the output capacitor is used to estimate the capacitor current. As shown in FIG. 18(*c*), a low pass filter may optionally be employed before the sensor to eliminate the noise of the ESL, as noted above.

FIG. 18(*d*) shows another embodiment of the capacitor current estimator. In this embodiment the output voltage is sampled at the auxiliary switching frequency during $T_{on}$ of the auxiliary switch (the ESL effect is predominant during $T_{off}$). The sampled voltage is smoothed with a low pass filter and fed into the aforementioned trans-impedance amplifier. Prior to a transient detection, the sample/hold (S/H) circuit is closed such that a rapid load transient may be detected without sampling delay. Intermittent sampling begins following a load transient.

$t_a$: Reduce Auxiliary Peak Current (Case #2 Only)

Figure 17B:
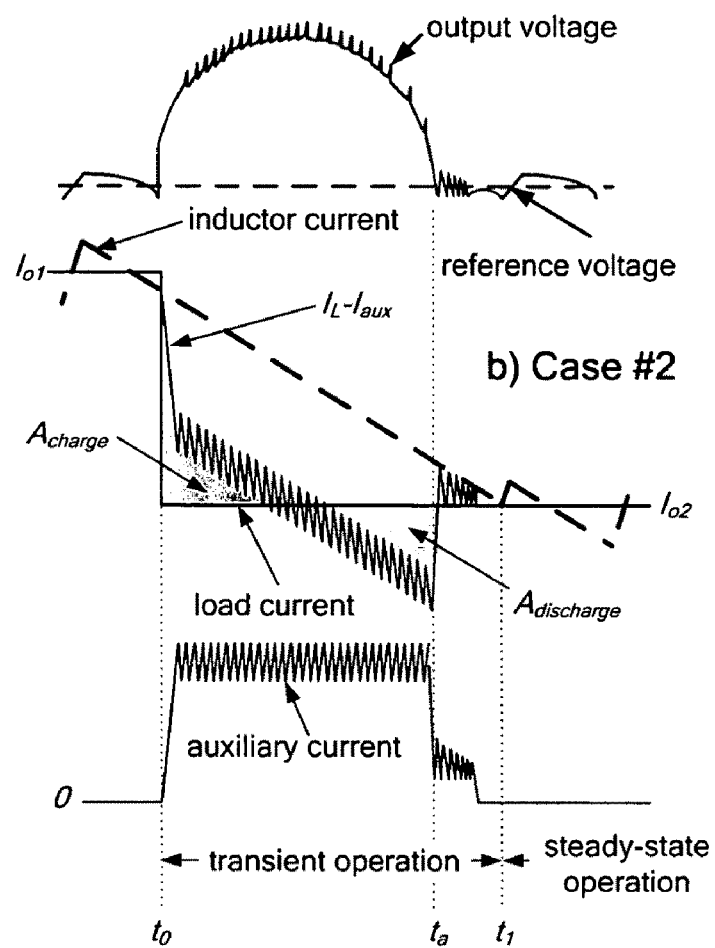

In the case where the output voltage returns to the reference voltage before the inductor current equals the new load current, the auxiliary current is reduced in order to prevent a voltage undershoot. Referring to the embodiment in FIG. 17(*b*), by adding the output of the capacitor current sensor to the average auxiliary current, the difference between the inductor current and the load current may be calculated ($I_c + I_{aux\_avg} = I_L - I_{o2}$). Following $t_a$, $I_{aux\_avg}$ is set to $I_L - I_{o2}$.

The embodiment of FIG. 18(*e*) shows another approach to Case #2. As shown, when the output voltage is detected to be equal to the reference voltage (at $t_a$), the main controller is switched from 0% duty cycle to the conventional linear controller. At $t_a$, the auxiliary current is slowly decreased at a constant rate until it reaches a minimum value (at $t_1$). This operation ensures that the output voltage will not significantly undershoot the reference voltage and prevents the de-activation of the auxiliary branch from greatly disturbing the conventional controller.

The embodiment of FIG. 18(*f*) shows a further approach to Case #2. At point $t_a$, the average auxiliary current is reduced to $0.5*(I_L - I_{o2})$ and held constant until point $t_1$. This ensures that the output voltage does not significantly deviate from the reference voltage from $t_a$ to $t_1$.

$t_1$: End of Transient (Case #1 and Case #2)

When $I_L - I_{o2} = 0$ or the auxiliary current has reduced to zero, the auxiliary circuit is completely deactivated and the main switch is controlled by the conventional controller.

To eliminate the possibility of Case #2, the auxiliary current level may be chosen depending on level of the load current step magnitude. This ensures that the inductor current equals the load current before the output voltage returns to the reference voltage. Such an embodiment is illustrated in FIG. 18 (*g*).

Example 3

Auxiliary Branch Controller with Variable Auxiliary Current

Figure 19:
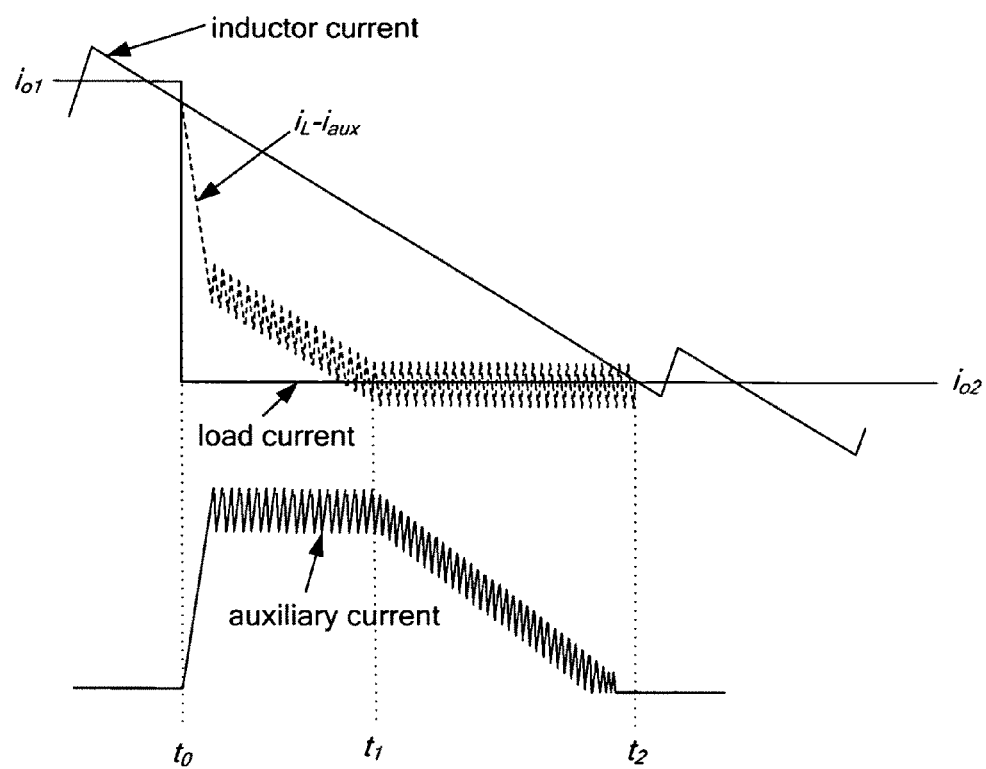
FIG. 19 shows dynamic performance of the circuit of FIG. 11(a) using a controller with variable auxiliary current level.

To prevent a voltage undershoot after the initial voltage overshoot, the auxiliary current may be controlled as shown in FIG. 19. This method eliminates the possibility of a voltage undershoot at the expense of settling time. As shown in FIG. 19, at time $t_1$, the auxiliary current level is reduced such that it equals $i_L - i_{o2}$. The auxiliary current level may be varied by controlling the auxiliary current reference with the output of the capacitor current sensor. This operation causes the output voltage to be relatively constant for time period $t_1$ to $t_2$. At time $t_2$, the conventional controller resumes control.

Example 4

Voltage Detector Auxiliary Branch Controller

The charge balance (1) and simplified (2) auxiliary branch controllers described above function properly for at least the following two cases:
a) The inductor current reaches the new load current before the output voltage returns to its nominal value.
b) The equivalent series inductance (ESL) of the output capacitors is low such that it does not significantly pollute the capacitor current sensor output when the high-frequency auxiliary branch is activated.

For cases in which either or both of the above conditions are not true, a voltage detector controller may be used to control the auxiliary branch. The controller requires only output voltage information to function and is less susceptible to ESL-related noise.

Figure 20:
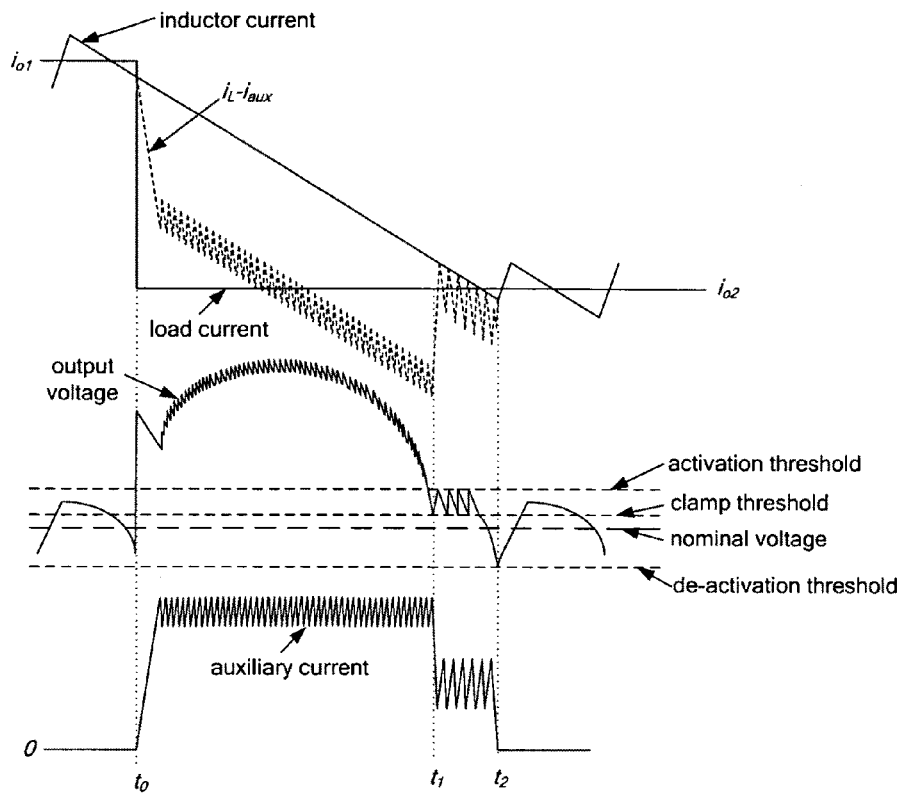
FIG. 20 shows dynamic performance of the circuit of FIG. 11(a) using a voltage level detector to determine when to activate/de-activate the auxiliary circuit.
Figure 21:
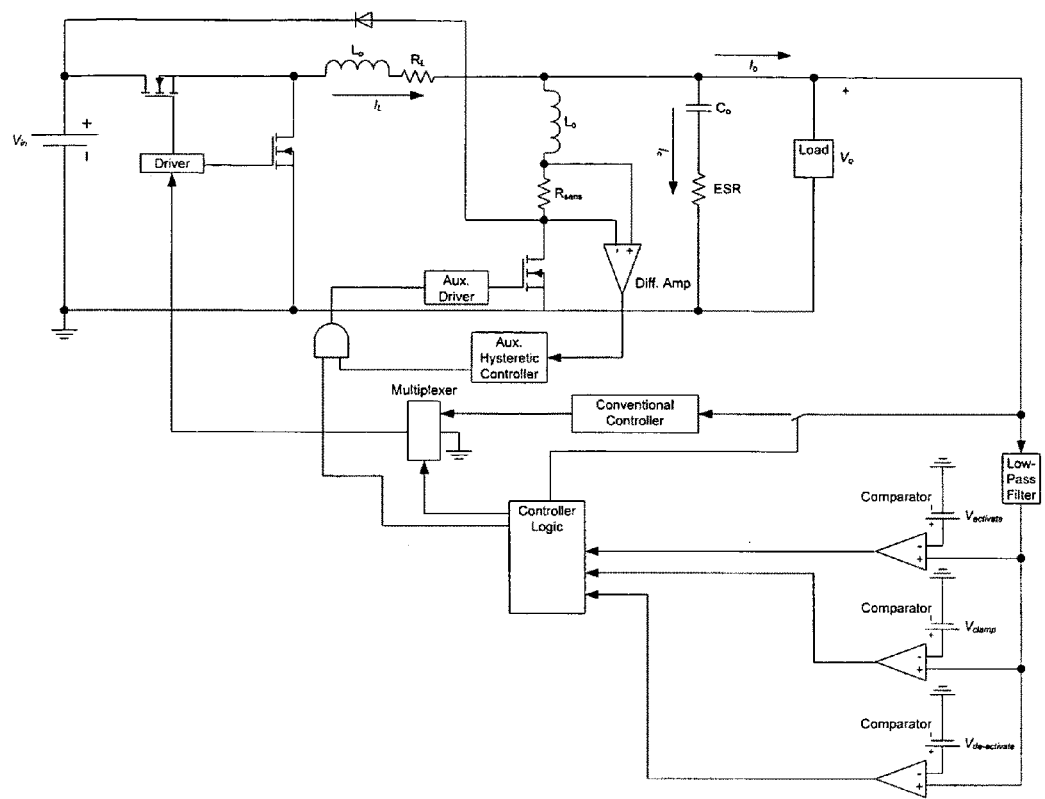
FIG. 21 shows a block diagram of the voltage level detector controller for the circuit of FIG. 11(a)

FIG. 20 shows the operation and the improved transient waveforms for a negative load current step, and FIG. 21 shows a circuit diagram of the controller. The auxiliary branch control may be described in 3 steps:

Step 1: Detect Current Step Change ($t_0$)

Referring to FIG. 20, the load rapidly steps from heavy to light load at time $t_0$. This causes the output voltage to quickly rise above the activation threshold which causes the controller to engage. (Note: The current step could also be detected using the aforementioned capacitor current sensors described above.) At time $t_0$, the controller immediately sets the duty cycle to 0% and activates the auxiliary branch.

Step 2: Cycle the Auxiliary Branch to Maintain Output Voltage ($t_1$)

In some cases, the output voltage returns to its nominal value before the inductor current decreases to the new load current value. If the auxiliary branch were to remain on during this time period, the output voltage would undershoot the nominal voltage considerably. To address this, the auxiliary branch is cycled on and off, thereby maintaining the output voltage between a pre-determined range until the inductor current reaches its new steady state value. When the output voltage dips below the clamp threshold, the auxiliary branch is disabled. When the output voltage exceeds the activation threshold, the auxiliary branch is enabled. Therefore, the output voltage is maintained between the "clamp threshold" and the "activation threshold" for the time period $t_1 - t_2$.

Step 3: De-Activate Auxiliary Branch and Return Control to the Conventional controller ($t_2$)

At time $t_2$ the output voltage travels below the de-activation threshold. This indicates that the inductor current has decreased below the load current. At this point, the auxiliary branch is de-activated and the conventional controller resumes control of the converter.

Figure 22:
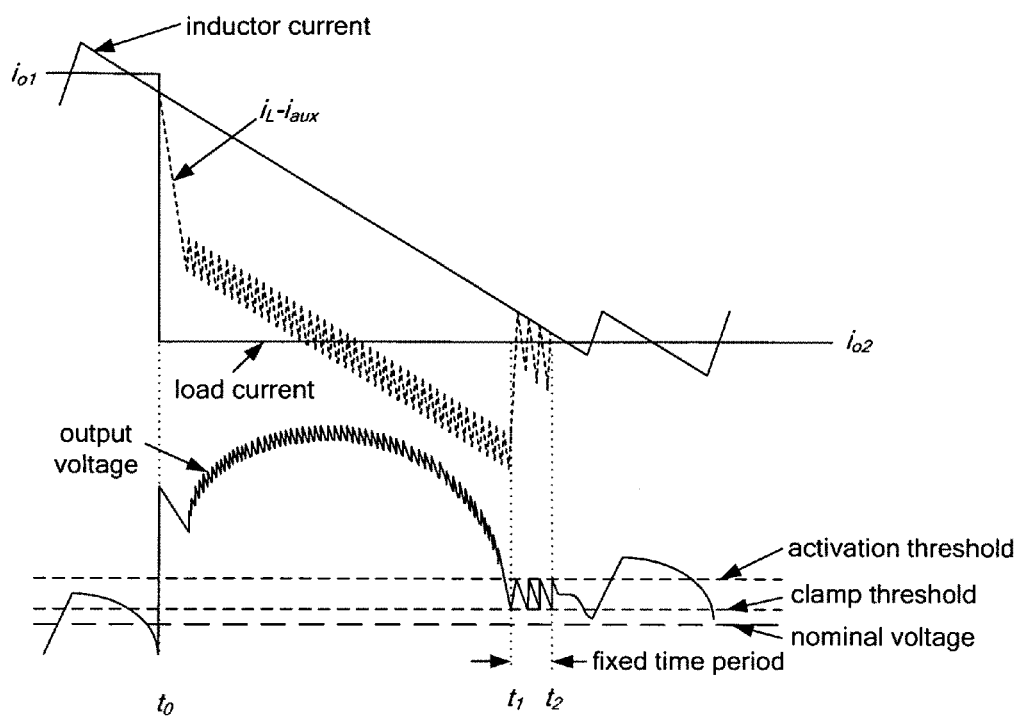
FIG. 22 shows dynamic performance of the circuit of FIG. 11(a) using a fixed de-activation time based on the voltage level detector method.

A variation of the output voltage hysteretic band controller is presented in FIG. 22. In this version, the controller is de-activated a fixed time period after the output voltage reaches the clamp threshold. Tuning may be required to achieve the desired response; however, this method prevents the voltage undershoot apparent in FIG. 20 (at $t_2$) and eliminates one comparator.

Example 5

Simulation

To verify the functionality of the charge balance controller and the converter topology modification, a synchronous Buck converter was simulated using PSIM™ (Powersim Inc., Woburn, Mass.; www.powersimtech.com). The converter had the following parameters: L=1 uH, C=1360 uF, ESR=1 mΩ, $R_L$=1 mΩ, $Rds_{on}$(high)=11 mΩ, $Rds_{on}$(low)=4 mΩ, and fs=400 kHz. A 20 A load current step (5 A→25 A) was applied to a voltage-mode controller, a peak current mode controller, and a charge balance controller according to an embodiment of the invention. The voltage mode and peak current mode controllers were designed with a phase margin of 45 degrees. Table 1 summarizes the results and refers to the relevant figures.

TABLE 1

Positive load current step simulation results

Figure 23:
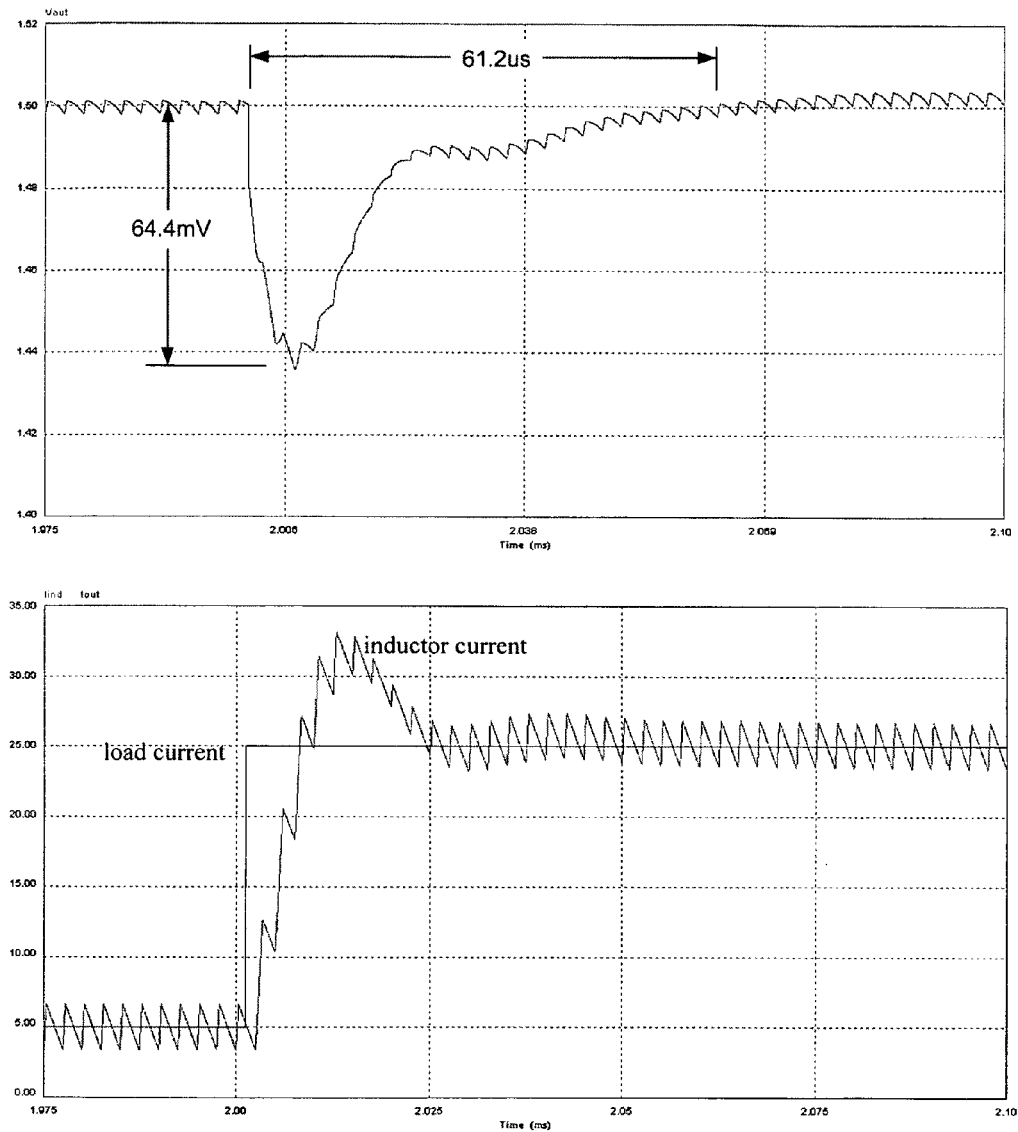
FIGS. 23 to 25 are graphs showing the results of a simulation comparing the response of a voltage mode controller (FIG. 23; Bandwidth (BW)=46 kHz), a current mode controller (FIG. 24; BW=67 kHz), and a dynamic controller according to an embodiment of the invention (FIG. 25) to a positive load current step (5 A→25 A). For each figure: top panel, output voltage; bottom panel, inductor current and load current.
Figure 24:
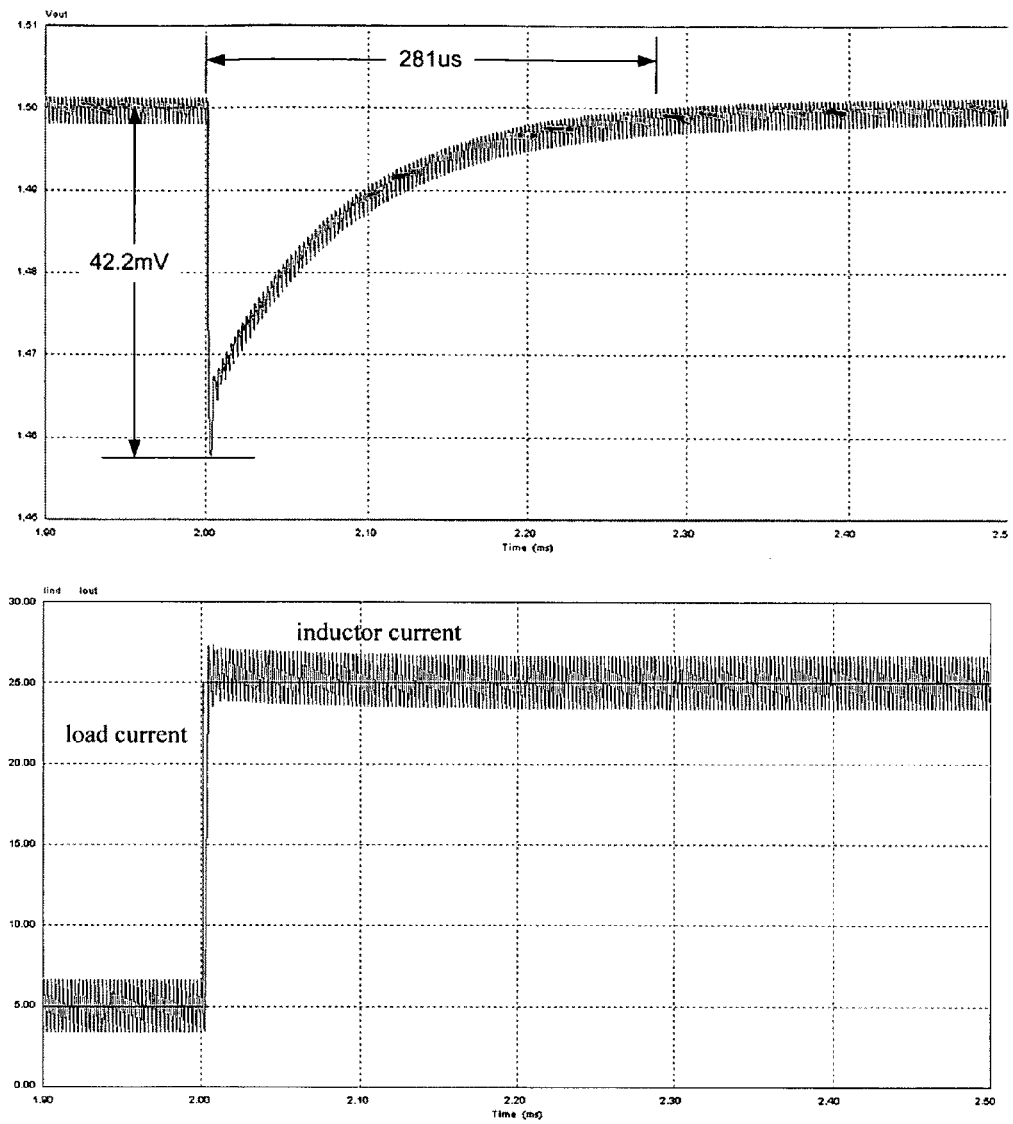
Figure 25:
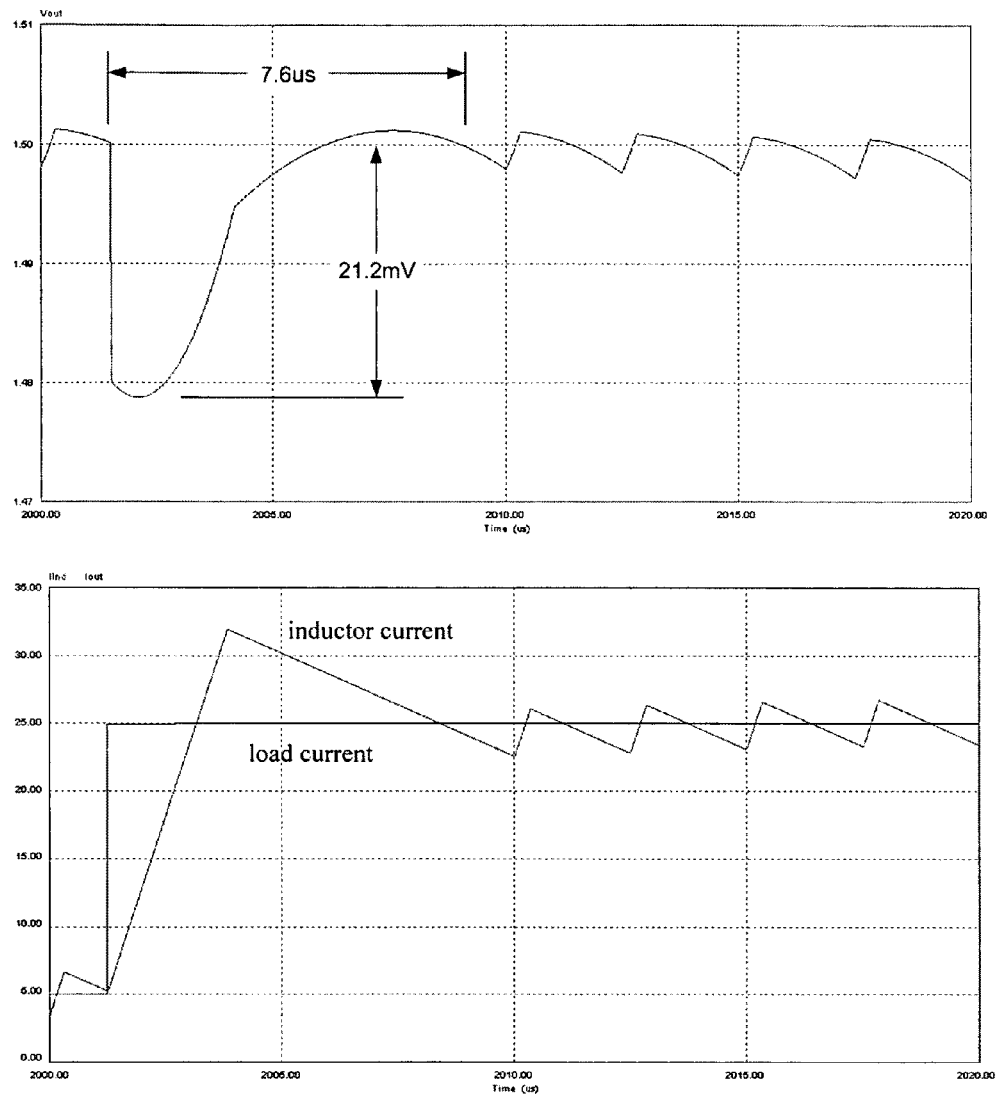

| Load Current Transient | | Voltage Mode BW = 46 kHz FIG. 23 | Current Mode BW = 67 kHz FIG. 24 | Charge Balance Control FIG. 25 |
|---|---|---|---|---|
| Positive Step (5 A --> 25 A) | Undershoot | 64.4 mV | 42.2 mV | 21.2 mV |
| | Settling Time | 61.2 us | 281 us | 7.6 us |

The simulation also included a negative load current step (25 A→5 A) to demonstrate the effectiveness of the auxiliary branch. The auxiliary branch parameters were: $I_{aux\_arg}$=9 A, $f_{aux}$=6.75 MHz, and $L_{aux}$=80 nH. For the output voltage hysteretic band controller, $I_{aux\_arg}$=12 A. Table 2 summarizes the results and refers to the relevant figures.

TABLE 2

Negative load current step simulation results

Figure 26:
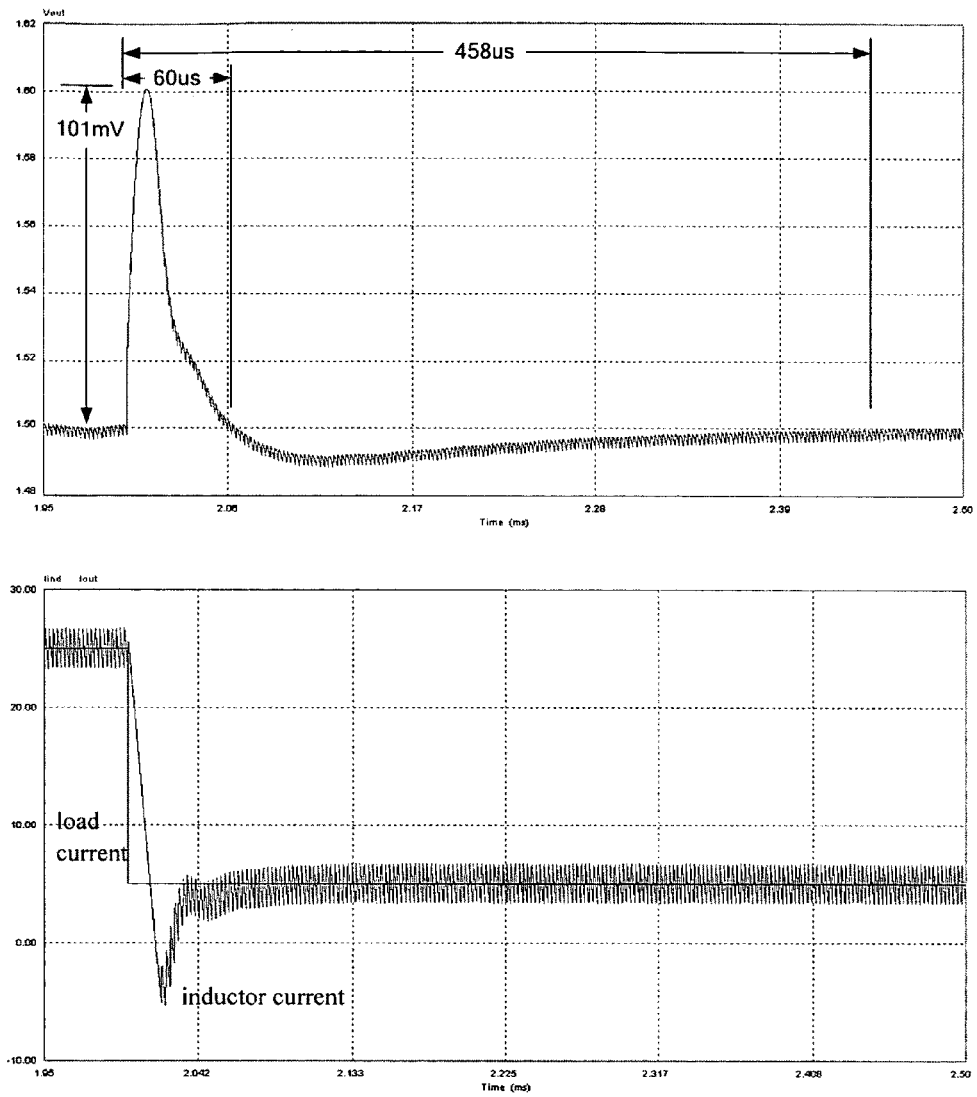
FIGS. 26 to 28 are graphs showing the results of a simulation comparing the response of a voltage mode controller (FIG. 26; BW=46 kHz), a current mode controller (FIG. 27; BW=67 kHz), and a charge balance controller according to an embodiment of the invention (FIG. 28) to a negative load current step (25 A→5 A). For each figure: top panel, output voltage; bottom panel, inductor current and load current.
Figure 27:
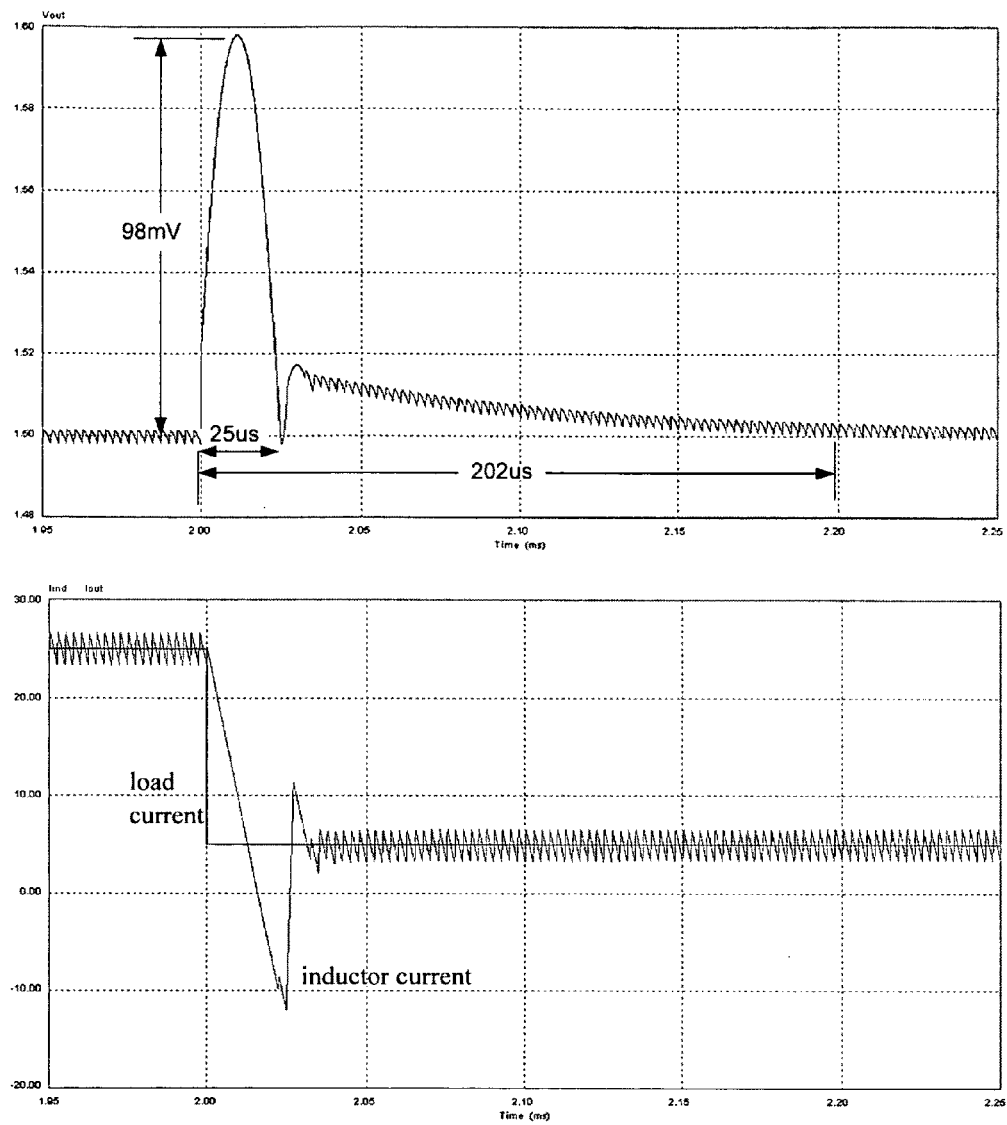
Figure 28:
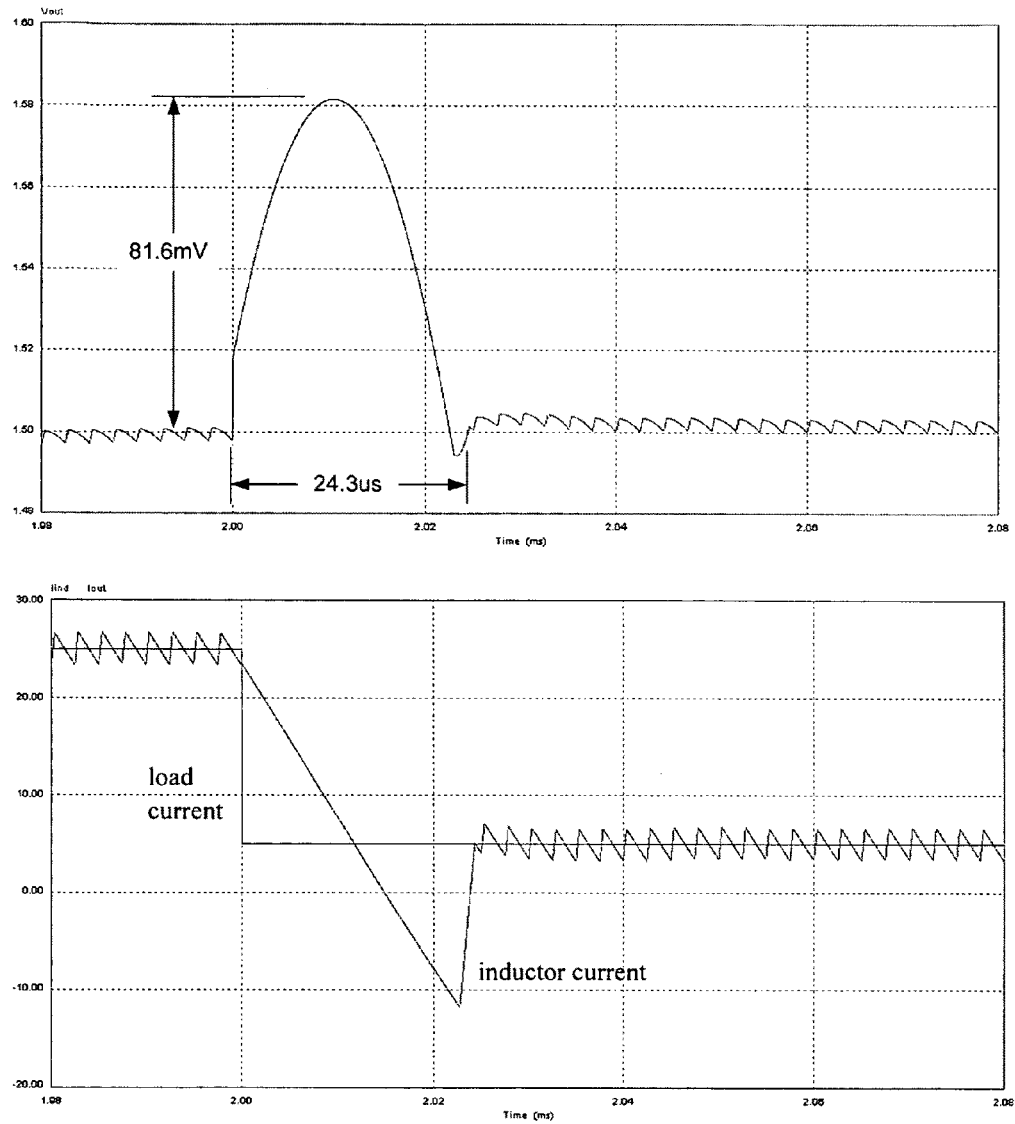
Figure 29:
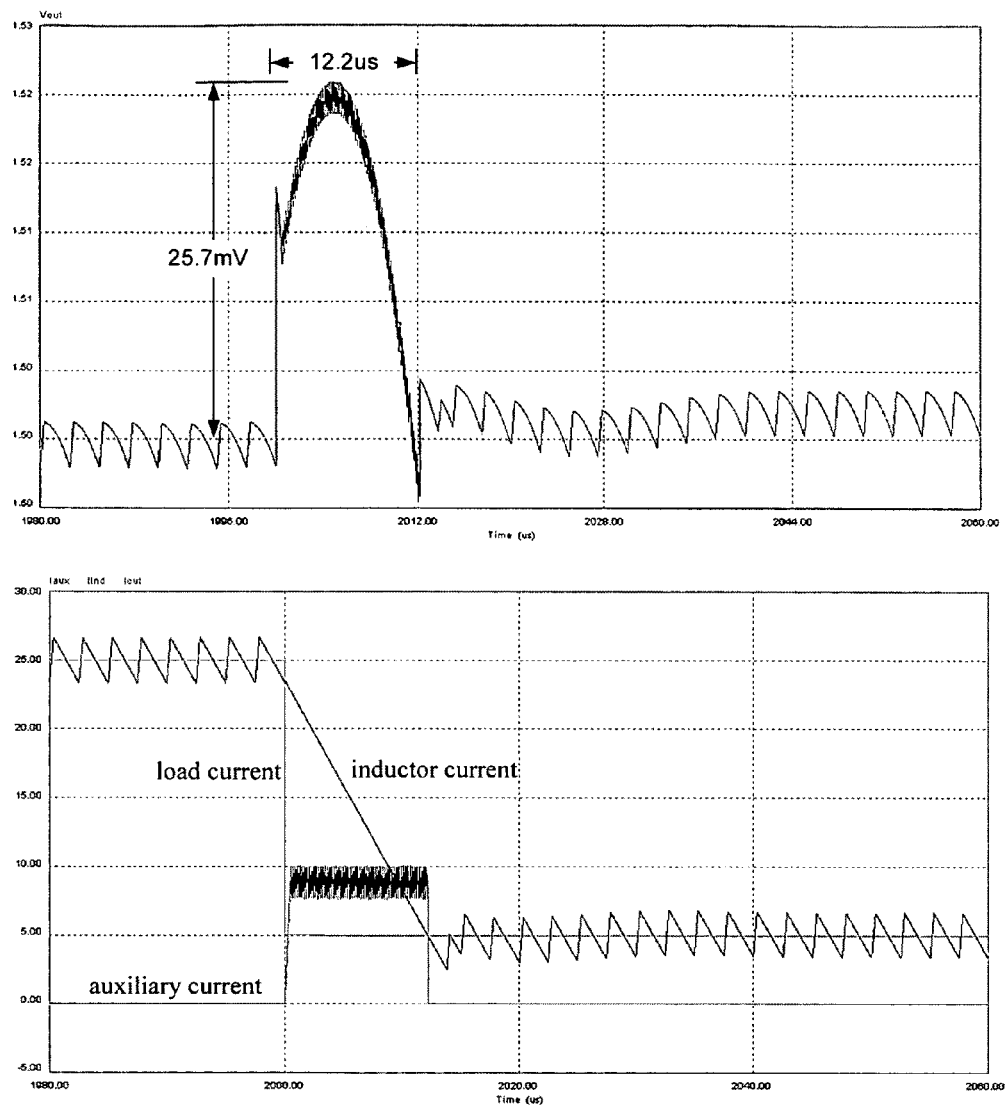
FIGS. 29 to 31 are graphs showing the results of a simulation comparing the responses of three embodiments of the controller with auxiliary branch to a negative load current step (25 A→5 A).
Figure 30:
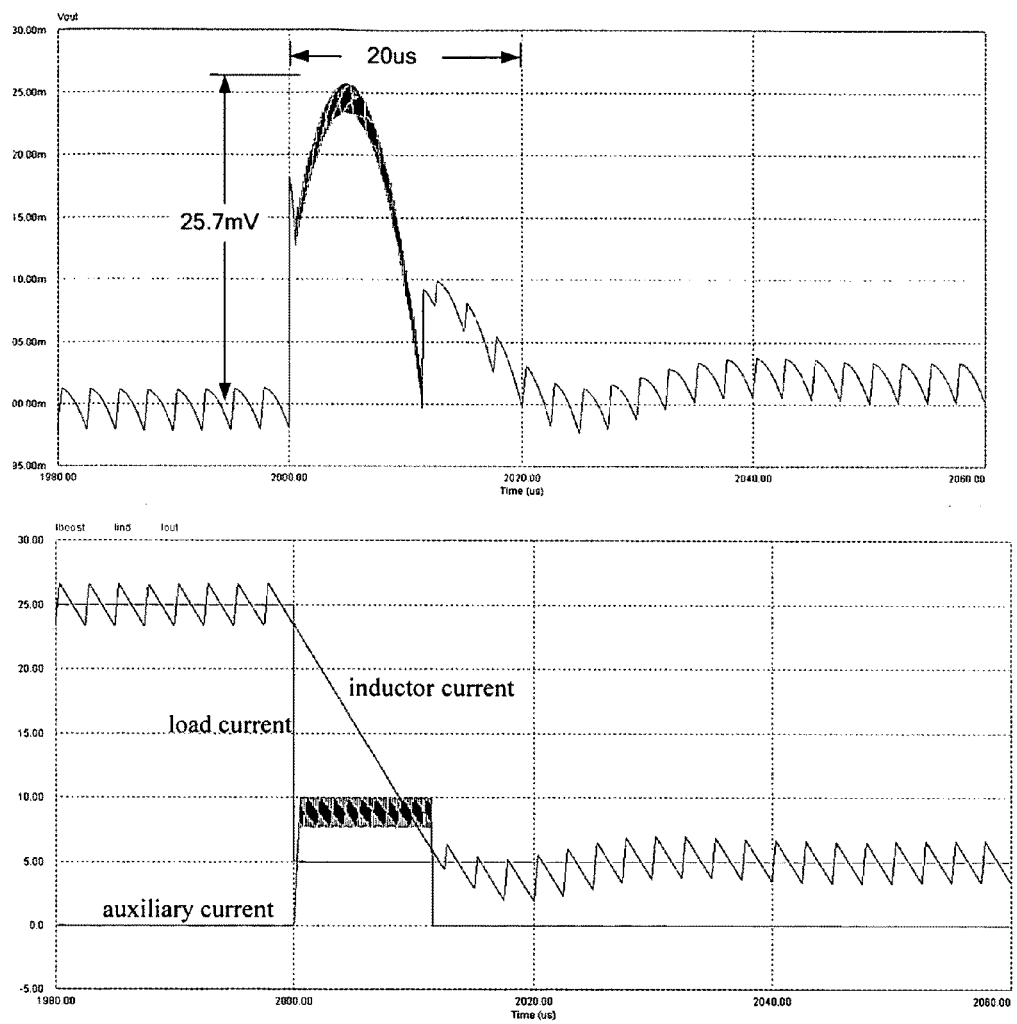
Figure 31:
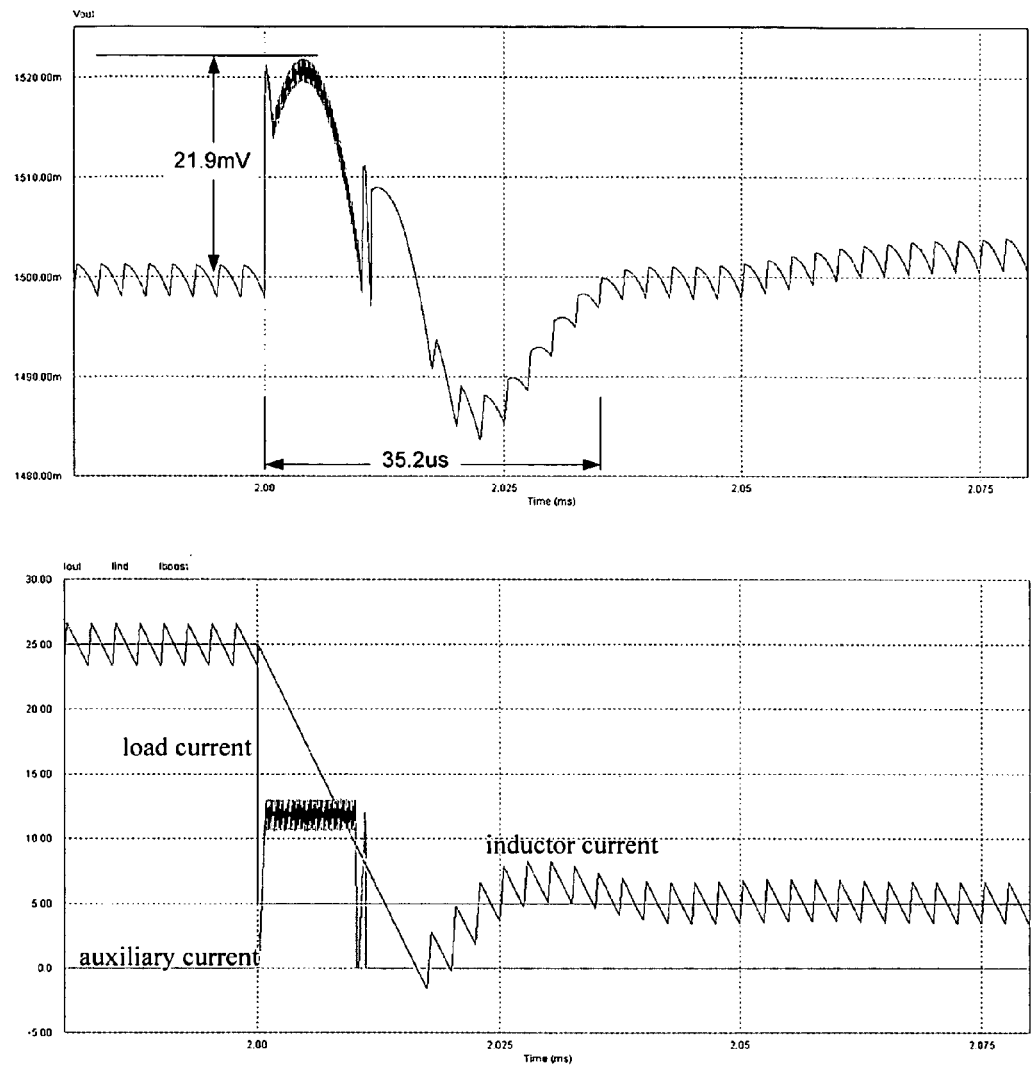

| Load Current Transient | | Voltage Mode 46 kHz FIG. 26 | Current Mode 67 kHz FIG. 27 | Charge Balance Control FIG. 28 | Auxiliary Branch (charge balance) FIG. 29 | Auxiliary Branch (Simplified) FIG. 30 | Auxiliary Branch (Voltage Detector) FIG. 31 |
|---|---|---|---|---|---|---|---|
| Negative Step (25 A --> 5 A) | Delta V | 101 mV | 96.8 mV | 81.6 mV | 25.7 mV | 25.7 mV | 21.9 mV |
| | Sett. Time | 458 us | 202 us | 24.3 us | 12.2 us | 20 us | 35.2 us |

The simulation results demonstrate the superior response, relative to voltage mode and current mode controllers, of the charge balance controller to both positive and negative load current steps. This response may be further improved by increasing $i_{aux\_avg}$. However, such modification will require either an increase in auxiliary switching frequency or an increase in peak auxiliary current.

Example 6

Experimental Results

A prototype of the charge balance controller was designed and implemented for a Buck converter with the following parameters: $V_{in}$=12 V, $V_{out}$=1.5 V, $f_s$=400 kHz, $L_o$=1 uH, $C_o$=180 uF, ESR=0.5 mΩ, ESL=100 pH.

For reference, the charge balance controlled Buck converter was compared with a voltage-mode controlled Buck converter with an approximate bandwidth of 71 kHz.

Figure 32:
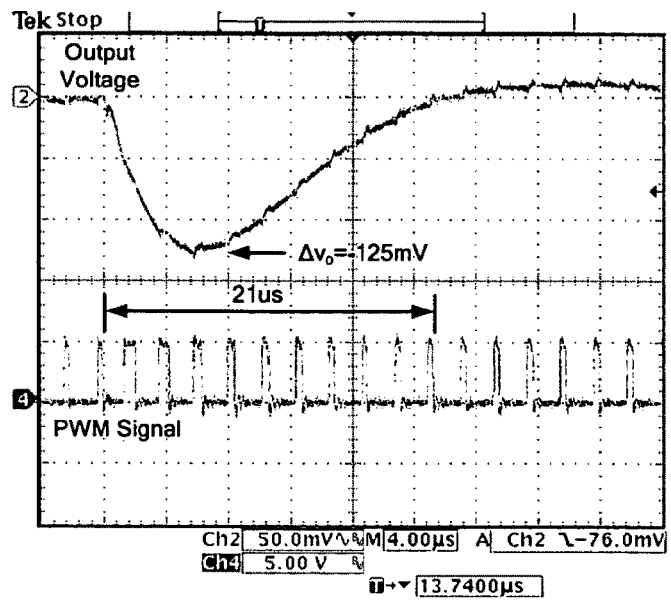
FIGS. 32 and 33 show the performance of a Buck converter with a voltage-mode controller and a Buck converter with a controller according to an embodiment of the invention, respectively, in response to a 0 A→10 A load current step change.
Figure 33:
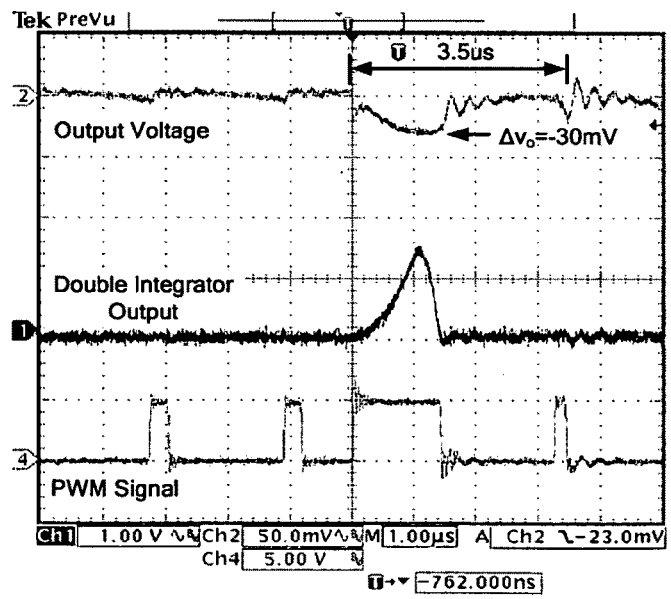

FIGS. 32 and 33 show performance of the Buck converter with a voltage-mode controller and the Buck converter with the prototype controller undergoing a 0 A→10 A load step change, respectively.

The results show that for a positive 10 A load current step change, the settling time of the converter with the prototype controller was improved by 82% compared to that of the voltage-mode controlled converter. It is also shown that the undershoot of the converter with the prototype controller is improved by 76% compared to that of the voltage-mode controlled converter.

Figure 34:
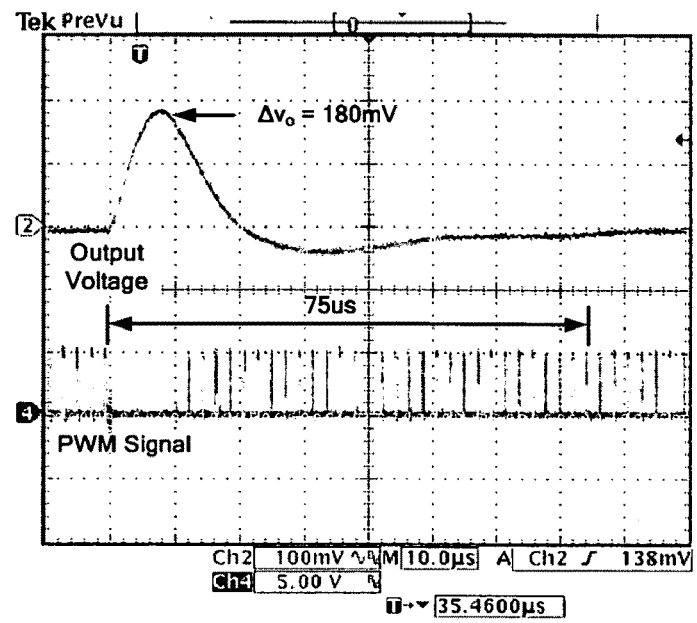
FIGS. 34 and 35 show the performance of a Buck converter with a voltage-mode controller and a Buck converter with a controller according to an embodiment of the invention, respectively, in response to a 10 A→0 A load current step change.
Figure 35:
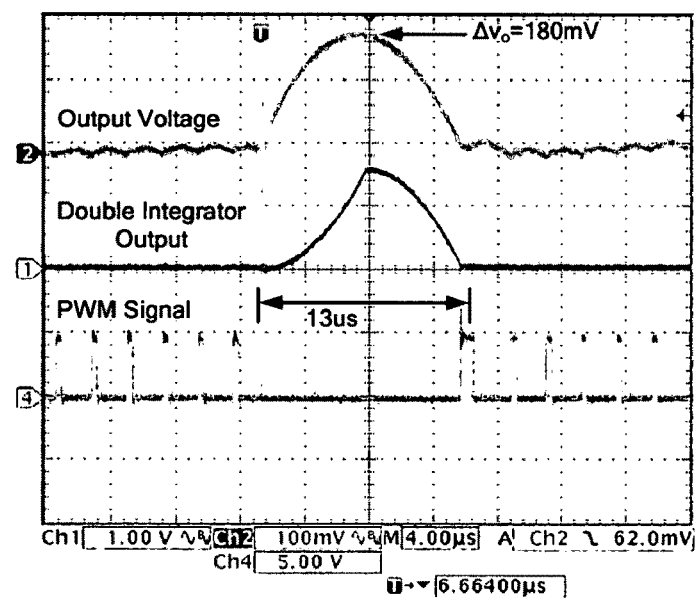

FIGS. 34 and 35 show performance of the voltage-mode controlled Buck converter (with a bandwidth of approximately 71 kHz) and the Buck converter with the prototype controller undergoing a 10 A→0 A load step change, respectively.

The results show that for a 10 A negative load current step change, the settling time of the converter with the prototype controller was improved by 84% compared to that of the voltage-mode controlled converter. Due to the quick reaction time of the voltage-mode controller to reduce the duty cycle from approximately 13% to 0%, there is no overshoot improvement. However, it is expected that an improvement in overshoot would be apparent for higher duty cycle applications (e.g., 5 V to 2.5 V).

Figure 36:
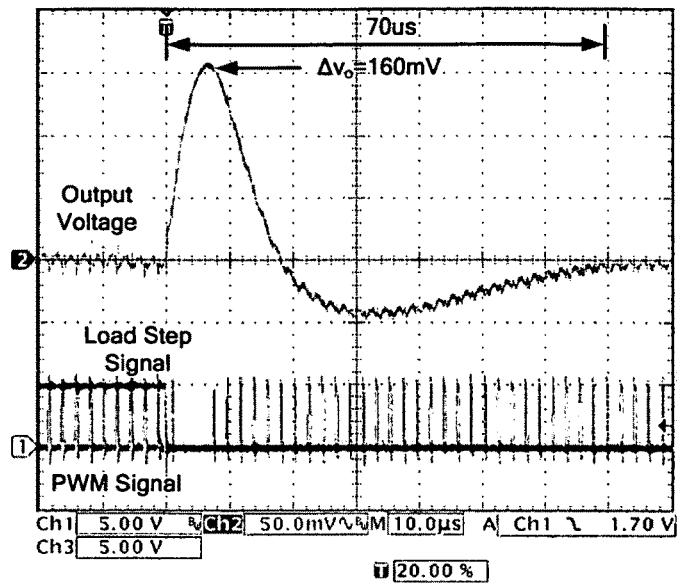
FIGS. 36 and 37 show the performance of a Buck converter with a voltage-mode controller and a Buck converter with a controller having an auxiliary circuit according to an embodiment of the invention, respectively, in response to a 10 A→0 A load current step change.
Figure 37:
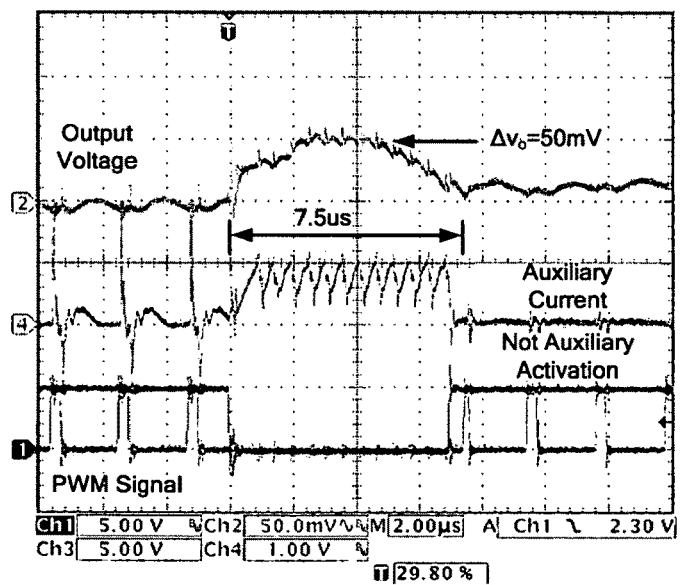

A converter having an auxiliary branch (based on the circuit of FIG. 11(a)) was tested with a prototype simplified auxiliary branch controller (based on the circuit of FIG. 18(a)), with the following parameters: $V_{in}$=12 V, $V_o$=1.5 V, $L_o$=1 uH, $C_o$=190 uF, $f_s$=400 kHz, $L_{aux}$=100 nH, $f_{aux}$=1.8 MHz, $I_{aux}$≈4.8 A ESR=0.5 mOhm, ESL=100 pH. A SOT-23 MOSFET (Fairchild FDN335N 1.7 A, 20 V) and a 2 A Schottky diode were used for the auxiliary switching. FIGS. 36 and 37 show a conventional, voltage-mode controlled Buck converter and the prototype converter undergoing a 10 A→0 A load step change respectively. The output voltage overshoot was reduced from 160 mV to 50 mV (neglecting ESL spikes), a reduction of 69%.

Example 7

Digital Charge Balance Controller

7.1 Description

Figure 38:
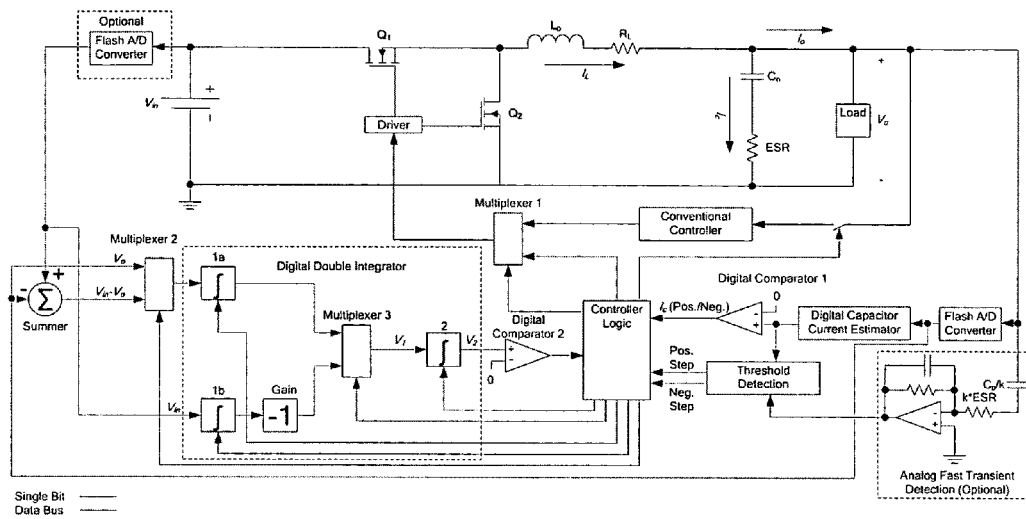
FIG. 38 shows an embodiment of a digital implementation of the controller circuit.

As noted above, the charge balance controller may be implemented using analog or digital components. FIG. 38 shows an embodiment of a digital implementation. The digital capacitor current estimator and the digital dual integrator are described in detail below:

Digital Capacitor Current Estimator

The digital capacitor current estimator (see FIG. 38) monitors the output voltage of the converter in order to estimate the output capacitor current $i_c$. The transfer function of the capacitor impedance is defined in equation (23).

$$\frac{v_o(s)}{i_c(s)} = s \cdot C_o + ESR \tag{23}$$

Solving for $i_c(s)$ and simplifying yields equation (24).

$$i_c(s) = v_o(s) \frac{s \cdot C_o}{s \cdot C_o \cdot ESR + 1} \tag{24}$$

By using the Bilinear (Tustin) approximation, shown in equation (25), (24) can be converted to the z-domain as demonstrated in (26).

$$s = \frac{2}{T_s} \frac{1 - z^{-1}}{1 + z^{-1}} \tag{25}$$

where $T_s$ represents the sampling period.

$$i_c(z) = v_o(z) \frac{\frac{2 \cdot C_o}{2 \cdot ESR \cdot C_o + T_s}(1 - z^{-1})}{1 - z^{-1} \frac{2 \cdot ESR \cdot C_o - T_s}{2 \cdot ESR \cdot C_o + T_s}} \tag{26}$$

Equation (26) can be rearranged to produce equation (27).

$$i_c(z) = K_1 \cdot v_o(z) - K_1 \cdot v_o(z) z^{-1} + K_2 \cdot i_c(z) z^{-1} \tag{27}$$

$$K_1 = \frac{2 \cdot C_o}{2 \cdot ESR \cdot C_o + T_s}, K_2 = \frac{2 \cdot ESR \cdot C_o - T_s}{2 \cdot ESR \cdot C_o + T_s}$$

Figure 39:
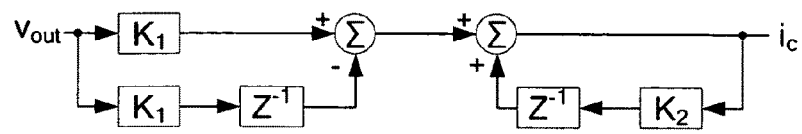
FIG. 39 shows an embodiment of a digital capacitor current estimator used in the circuit of FIG. 38.
Figure 40:
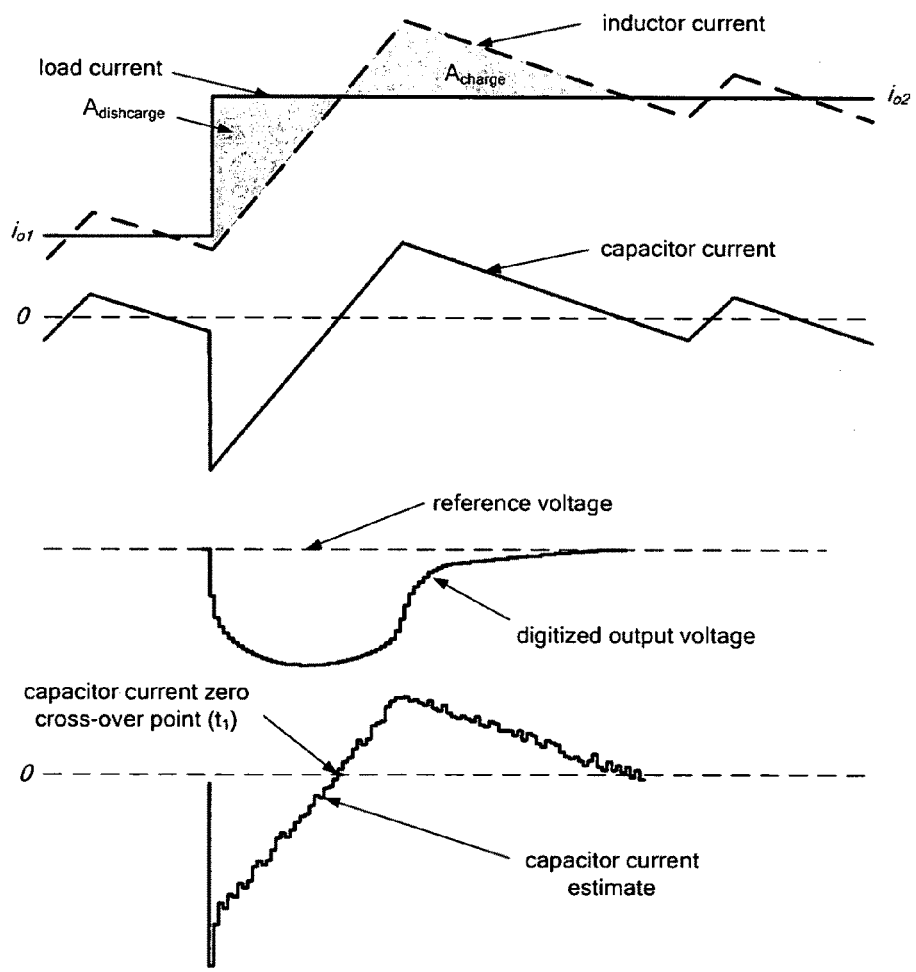
FIG. 40 shows the capacitor current estimate following a positive load step, for the circuit of FIG. 39.

The function in equation (27) may be implemented as shown in the embodiment illustrated in FIG. 39. The capacitor current estimation compared to the actual capacitor current following a positive load step is shown in FIG. 40.

The capacitor current zero cross-over point ($t_1$) may be precisely determined. For example, by increasing the sampling frequency, the resolution of $t_1$ can be improved; however, the quantization noise (apparent in FIG. 40) will be increased. To improve the effective resolution and accuracy of $t_1$ while not increasing the sampling frequency, a zero cross-over point predictor may be used, as shown in FIG. 41.

Figure 41:
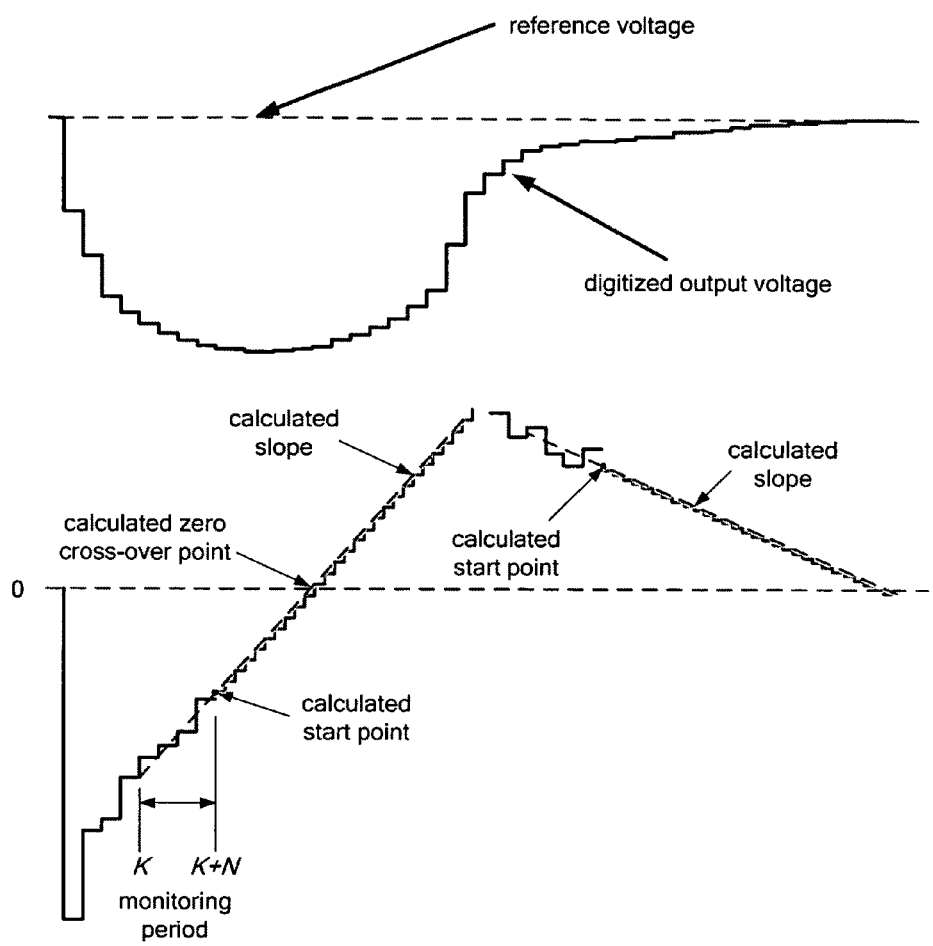
FIG. 41 shows a method for increasing resolution of capacitor current zero cross-over point.

To increase the effective resolution of the capacitor current estimation, the capacitor current slope may be calculated using a set of samples of capacitor current estimations (shown in FIG. 41). The slope calculation is presented in (28).

$$M = \frac{1}{N} \frac{T_{eff}}{T_s} \sum_{n=K}^{K+N} [i_c(n) - i_c(n-1)] \tag{28}$$

where N is the number of capacitor current samples used, $T_{eff}$ is the chosen effective resolution and $T_s$ is the sampling frequency of the ADC. For relatively simple digital calculation, N and $T_{eff}/T_s$ may be chosen to be $2^x$. In this manner, multiplication may be carried out by simply shifting register bits.

After the slope is calculated, the subsequent capacitor current values are calculated without sampling the output voltage. The start point of the calculated capacitor current values is derived in (29) and subsequent values are derived in (28).

$$i_{c\_calc}(K+N) = \frac{1}{2} \sum_{n=K}^{K+N} i_c(n) + \frac{N \cdot M}{2} \cdot \frac{T_s}{T_{eff}} \tag{29}$$

$$i_{c\_calc}(n) = i_{c\_calc}(K+N) + (n - K - N) * M \text{ for } n > K + M \tag{30}$$

By using the aforementioned algorithm, the capacitor current zero cross-over point may be predicted with increased resolution.

Digital Dual Integrator

Figure 42:
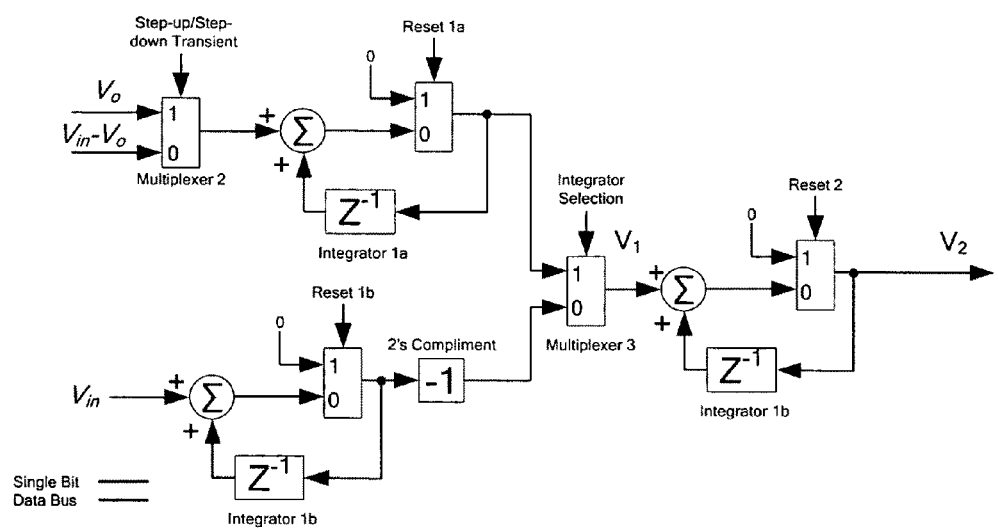
FIG. 42 is a block diagram of an embodiment of the digital double integrator used in the digital controller of FIG. 38.

A block diagram of an embodiment of the digital double integrator is shown in FIG. 42. $V_{in}$ may be measured using an additional ADC at the input (e.g., as shown in FIG. 38) or it may be programmed constant for converters with constant inputs.

7.2 Operation

The converter switches from conventional operation to charge balance operation as described herein immediately following a current step change. The conventional controller may be implemented digitally or through an analog scheme. The controller operation may be described in four steps.

Step 1: Detect Current Step Change ($t_0$)

The controller detects a load step using the aforementioned digital capacitor current estimator. For increased speed, the controller may utilize an analog trans-impedance amplifier, connected to the output voltage (e.g., as shown in FIG. 38) to detect transient events without sampling delay.

When the capacitor current exceeds a predetermined threshold, the controller will immediately change the duty cycle of the control switch of the converter to 100% (for a positive step change), or 0% (for a negative step change).

At this point, the conventional controller input is disconnected to hold the control voltage/digital value relatively constant over the transient period.

Figure 43:
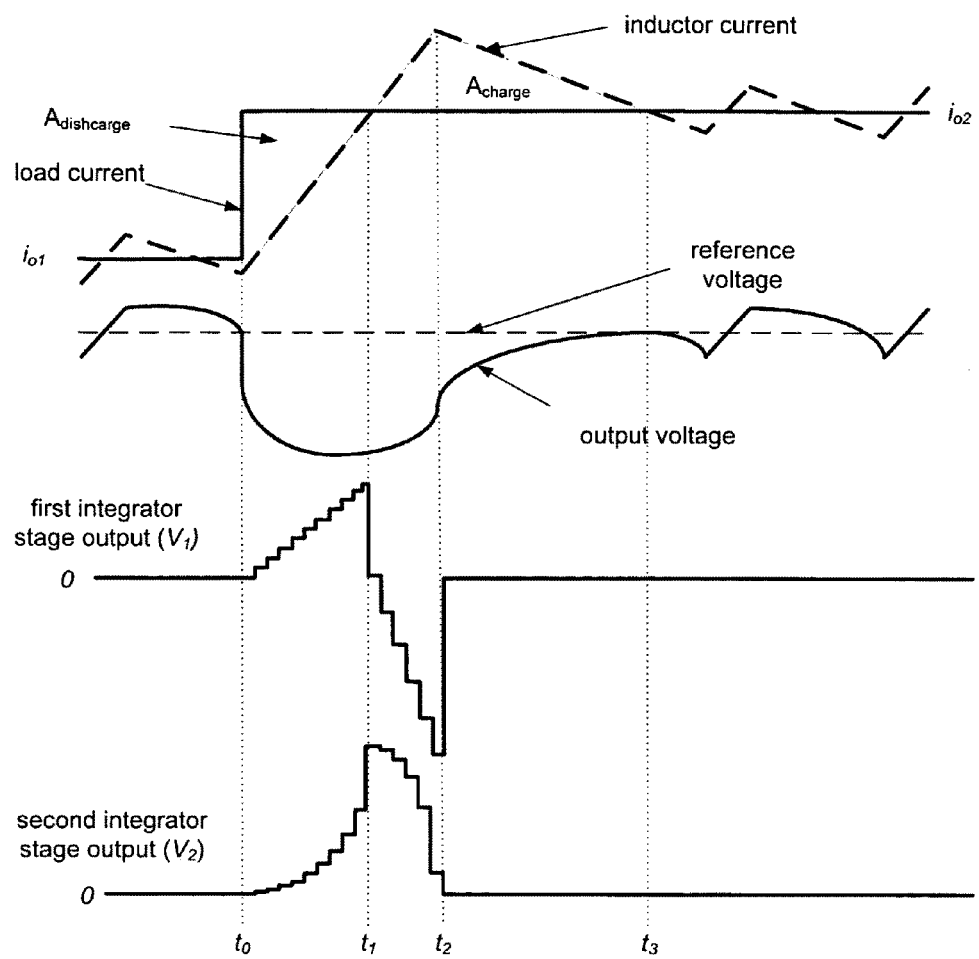
FIG. 43 shows keys waveforms of operation of the digital controller of FIG. 43 following a positive load current step.

The controller logic releases the "reset" switch of integrator 1a and integrator 2 (see FIG. 38). With reference to FIG. 43, the output of integrator 1a will begin to increase linearly with a slope of $V_o$ (for a positive step change), or $V_{in} - V_o$ (for a negative step change). The output of integrator 2 will begin to increase exponentially.

Step 2: Detect Capacitor Current Cross-Over ($t_1$)

A digital comparator fed by the aforementioned capacitor current estimator is used to determine the zero cross-over point. At this point, integrator 1a will be "reset" and integrator 1b will be activated. The output of integrator 1b will begin to decrease linearly with a slope of $-V_{in}$. The output of integrator 2 will begin to decrease exponentially (see FIG. 43).

Step 3: Alter Duty Cycle ($t_2$)

At the moment that the output of integrator 2 returns to zero, the duty cycle of the control switch will be set to 0% (for a positive step change) or 100% (for a negative step change). The inductor current will begin to approach the new load current.

Step 4: De-Activate Controller ($t_3$)

At $t_3$, the inductor current reaches the new load current (determined by a second capacitor current switchover) and the output voltage returns to its reference value. At this point, the charge balance controller deactivates and the conventional controller resumes control of the converter.

All cited publications are incorporated herein by reference in their entirety.

EQUIVALENTS

Those of ordinary skill in the art will recognize, or be able to ascertain through routine experimentation, equivalents to the embodiments described herein. Such embodiments are within the scope of the invention and are covered by the appended claims.

REFERENCES

[1] G. Feng, E. Meyer, Y-F. Liu, "A New Digital Control Algorithm to Achieve Optimal Dynamic Performance in DC-to-DC Converters", IEEE Transactions on Power Electronics, Volume 22, Issue 4, July 2007, pp. 1489-1498 "fjdka"
[2] E. Meyer, Y-F. Liu, "A Quick Capacitor Charge Balance Control Method to Achieve Optimal Dynamic Response for Buck Converters", IEEE Power Electronics Specialists Conference (PESC), 2007, pp. 1549-1555
[3] K. K. S Leung, H. S. H. Chung, "A Comparative Study of Boundary Control With First- and Second-Order Switching Surfaces for Buck Converters Operating in DCM", IEEE Transactions on Power Electronics, Volume 22, Issue 4, July 2007, pp. 1196-1209
[4] X. Wang, I. Batarseh, S. A. Chickamennahalli, E. Standford, IEEE Transactions on Power Electronics, Volume 22, Issue 4, July 2007, pp. 1472-1479
[5] H. Zhou, X. Wang, T. Wu, I. Batarseh, "Magnetics Design for Active Transient Voltage Compensator", IEEE Applied Power Electronics Conference (APEC), 2006
[6] A. Consoli, A. Testa, G. Gianneto, F. Gennaro, F. "A New VRM Topology for Next Generation Microprocessors", IEEE Power Electronics Specialists Conference (PESC), 2001, pp. 339-344
[7] O. Abdel-Rahman, I. Batarseh, "Transient Response Improvement in DC-DC Converters Using Output Capacitor Current for Faster Transient Detection", IEEE Power Electronics Specialists Conference (PESC), 2007, pp. pp. 157-160
[8] X. Wang, L. Qingshui, I. Batarseh, "Transient Response Improvement in Isolated DC-DC Converter with Current Injection Circuit", IEEE Applied Power Electronics Conference (APEC), 2005, pp. 706-710
[9] A. Barrado, A. Lazaro, R. Vazquez, V. Salas, E. Olias, "The Fast Response Double Buck DC-DC Converter (FRDB): Operation and Output Filter Influence", IEEE Transactions on Power Electronics, Volume 20, Issue 6, November 2005, pp. 1261-1270

The invention claimed is:

1. A method for minimizing the output voltage deviation of a DC-DC converter in response to a load current step; comprising:
    (i) detecting a load current step to a new load current by estimating or detecting a change in stored charge of a parallel output capacitor of the DC-DC converter;
    (ii) modulating a duty cycle of the DC-DC converter to change current through a series output inductor, such current being different than the new load current; and
    (iii) modulating the duty cycle of the DC-DC converter to simultaneously cause (a) the inductor current to be equal the new load current and (b) the stored charge of the parallel output capacitor to be substantially returned to a state prior to the load current step;
    wherein estimating or measuring includes using a double integrator.

2. The method of claim 1; comprising:
    (A) (i) detecting a positive load current step to a new load current by estimating or measuring stored charge removed from the parallel output capacitor of the DC-DC converter;
        (ii) increasing a duty cycle of the DC-DC converter to increase current through a series output inductor, such current being greater than the new load current; and
        (iii) decreasing the duty cycle of the DC-DC converter to simultaneously cause (a) the inductor current to decrease to be equal the new load current and (b) the at least a portion of the stored charge removed from the parallel output capacitor during the positive load current step to be replaced; and/or
    (B) (i) detecting a negative load current step to a new load current by estimating or measuring charge added to the parallel output capacitor of the DC-DC converter;
        (ii) decreasing a duty cycle of the DC-DC converter to decrease current through a series output inductor, such current being less than the new load current; and
        (iii) increasing the duty cycle of the DC-DC converter to simultaneously cause (a) the inductor current to increase to be equal the new load current and (b) the charge added to the parallel output capacitor during the negative load current step to be removed.

3. The method of claim 2, wherein increasing the duty cycle of the DC-DC converter comprises increasing the duty cycle to a maximum value, and/or decreasing the duty cycle of the DC-DC converter comprises decreasing the duty cycle to a minimum value.

4. The method of claim 2, wherein detecting the positive load current step and/or the negative load current step comprises sensing the output capacitor current.

5. The method of claim 2, wherein detecting further comprises (i) estimating the output capacitor current by determining the output capacitor current slope using a set of capacitor current estimations or (ii) sensing the output capacitor current using a trans-impedance amplifier.

6. The method of claim 2, wherein the DC-DC converter is selected from a Buck, forward, push-pull, half-bridge, and full-bridge converter.

7. The method of claim 2, wherein the DC-DC converter is a Buck converter.

8. A controller for minimizing the output voltage deviation of a DC-DC converter in response to a load current step; comprising:
    (i) a detector for detecting a load current step to a new load current by estimating or detecting a change in stored charge of a parallel output capacitor of the DC-DC converter;
    (ii) means for modulating a duty cycle of the DC-DC converter to change current through a series output inductor, such current being different than the new load current; and (iii) means for modulating the duty cycle of the DC-DC converter to simultaneously cause (a) the inductor current to be equal the new load current and (b) the stored charge of the parallel output capacitor to be substantially returned to a state prior to the load current step;

wherein the detector comprises a double integrator.

9. The controller of claim 8; comprising:

(A) a detector for detecting a positive load current step to a new load current by estimating or measuring stored charge removed from the parallel output capacitor of the DC-DC converter;

means for increasing a duty cycle of the DC-DC converter to increase current through a series output inductor, such current being greater than the new load current; and means for decreasing the duty cycle of the DC-DC converter to simultaneously cause (a) the inductor current to decrease to be equal the new load current and (b) the at least a portion of the stored charge removed from the parallel output capacitor during the positive load current step to be replaced; and/or (B) a detector for detecting a negative load current step to a new load current by estimating or measuring charge added to the parallel output capacitor of the DC-DC converter;

means for decreasing a duty cycle of the DC-DC converter to decrease current through a series output inductor, such current being less than the new load current; and means for increasing the duty cycle of the DC-DC converter to simultaneously cause (a) the inductor current to increase to be equal the new load current and (b) the charge added to the parallel output capacitor during the negative load current step to be removed.

10. The controller of claim 9, wherein the means for increasing the duty cycle of the DC-DC converter increases the duty cycle to a maximum value, and/or the means for decreasing the duty cycle decreases the duty cycle to a minimum value.

11. The controller of claim 10, wherein the means for detecting comprises a trans-impedance amplifier that senses the output capacitor current or a means for estimating the output capacitor current by determining the output capacitor current slope using a set of capacitor current estimations.

12. The controller of claim 9, wherein the DC-DC converter is selected from a Buck, forward, push-pull, half-bridge, and full-bridge converter.

13. The controller of claim 9, wherein the DC-DC converter is a Buck converter.

* * * * *